United States Patent
Hand et al.

(10) Patent No.: US 11,487,586 B2
(45) Date of Patent: Nov. 1, 2022

(54) TIME-BASED ELEMENT MANAGEMENT IN A COMPUTER SYSTEM USING TEMPORAL NODE TREES

(71) Applicant: International Business Machines Corporation, Armonk, NY (US)

(72) Inventors: Leonard Scott Hand, Rochester, NY (US); Catherine Anne Chess, Ossining, NY (US); Christopher Murasso, Eastchester, NY (US); Christine Engeleit, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 16/288,246

(22) Filed: Feb. 28, 2019

(65) Prior Publication Data

US 2020/0278885 A1  Sep. 3, 2020

(51) Int. Cl.
*G06Q 10/00* (2012.01)
*G06F 9/50* (2006.01)
*G06F 11/07* (2006.01)
*G06F 11/30* (2006.01)
*G06F 16/22* (2019.01)
*G06Q 10/06* (2012.01)
*G06Q 10/10* (2012.01)

(52) U.S. Cl.
CPC .......... *G06F 9/505* (2013.01); *G06F 9/5061* (2013.01); *G06F 11/0766* (2013.01); *G06F 11/3065* (2013.01); *G06F 16/2246* (2019.01); *G06Q 10/0631* (2013.01); *G06Q 10/1093* (2013.01)

(58) Field of Classification Search
CPC .... G06F 9/505; G06F 16/2246; G06F 9/5061; G06F 11/0766; G06F 11/3065; G06Q 10/0631; G06Q 10/1093; G06Q 10/00; G06Q 10/02; G06Q 10/06; G06Q 10/10; G06Q 30/02
See application file for complete search history.

(56) References Cited

U.S. PATENT DOCUMENTS

| | | | |
|---|---|---|---|
| 2002/0032697 A1* | 3/2002 | French | G06T 17/005 715/211 |
| 2003/0028469 A1* | 2/2003 | Bergman | G06Q 30/06 705/37 |
| 2003/0176931 A1* | 9/2003 | Pednault | G06N 5/003 700/44 |

(Continued)

OTHER PUBLICATIONS

X. Ma, C. Ding, S. Luan, Y. Wang and Y. Wang, "Prioritizing Influential Factors for Freeway Incident Clearance Time Prediction Using the Gradient Boosting Decision Trees Method," in IEEE Transactions on Intelligent Transportation Systems, vol. 18, No. 9, pp. 2303-2310, Sep. 2017 (Year: 2017).*

*Primary Examiner* — Joseph M Waesco
*Assistant Examiner* — Jay-Ming Wang
(74) *Attorney, Agent, or Firm* — Yee & Associates, P.C.

(57) ABSTRACT

A method, apparatus, system, and computer program product for managing time-based elements. A computer system identifies the time-based elements, wherein the time-based elements have time units. The computer system arranges the nodes, representing the time-based elements, in a temporal node tree, wherein the nodes have the time units from corresponding time-based elements and a policy that defines scaling of the nodes based on the time units allocated to the nodes.

19 Claims, 14 Drawing Sheets

(56) References Cited

U.S. PATENT DOCUMENTS

| | | | |
|---|---|---|---|
| 2004/0010432 A1* | 1/2004 | Matheson | G06Q 10/06314 706/45 |
| 2005/0234757 A1* | 10/2005 | Matheson | G06Q 10/0639 705/7.22 |
| 2005/0273769 A1* | 12/2005 | Eichenberger | G06F 8/4452 717/136 |
| 2006/0041526 A1* | 2/2006 | Cline | G06Q 10/04 |
| 2007/0087756 A1* | 4/2007 | Hoffberg | G06Q 20/065 455/450 |
| 2007/0271276 A1* | 11/2007 | Allen | G06N 5/042 |
| 2013/0080641 A1* | 3/2013 | Lui | H04L 41/0886 709/226 |
| 2013/0155838 A1 | 6/2013 | Medina et al. | |
| 2013/0222402 A1* | 8/2013 | Peterson | G06F 9/5033 345/520 |
| 2013/0297868 A1 | 11/2013 | Yin et al. | |
| 2014/0282586 A1* | 9/2014 | Shear | G06F 16/24575 718/104 |
| 2014/0365149 A1 | 12/2014 | Hao et al. | |
| 2015/0106578 A1* | 4/2015 | Warfield | G06F 3/0653 711/158 |
| 2017/0330098 A1* | 11/2017 | Best | G06N 5/045 |
| 2018/0191867 A1 | 7/2018 | Siebel et al. | |

\* cited by examiner

```
"child": {
  702 — "id": "uuid              # Every node needs a unique identifier",
  704 — "parent": "uuid          # Pointer to the parent node",
  706 — "prev": "uuid            # Pointer to the previous node - null is the head",
  708 — "next": "uuid            # Pointer to the next node - null if the tail",
  710 — "lock": "boolean         # When true this node cannot be altered or moved",
  712 — "canMove": "boolean      # When true this node can be moved",
  714 — "priority": "int         # Used when there is a conflict",
  716 — "currentAllocation": "int # The number of timeUnits given to this node
                                    (minUnits - parent.maxUnits)",
  718 — "allocatedUnits": "int   # The number of timeunits distributed to children & content",
  720 — "minUnits": "int         # This is the minimum timeunits this node needs to exist
                                    (1 - maxUnits)",
  722 — "maxUnits": "int         # This is the maximum timeunits this node can havei
                                    (minUnits - xx)"
  724 — "start": "ISODate        # Date",
  726 — "owner": "person{} object  #
  728 — "state": "state{} object   #
  730 — "children": [ "child{} object  #
  732 — "content": "content{} object   #
  734 — "overlay": "overlay{} object   #
  736 — "distribution": "int       # Defines the distribution requirements (default 1)",
},
```

FIG. 7

```
800
┌─────────────────────────────────────────────────────────────────────────────────┐
│  "content": {                                                                   │
│  802 ─── "id": "uuid                    # Every node needs a unique identifier",│
│  804 ─── "parent": "uuid                # Pointer to the parent node",          │
│  806 ─── "lock": "boolean               # When true this object cannot be altered or moved", │
│  808 ─── "currentAllocation": "int      # The number of timeUnits given to this object │
│                                             (minUnits - parent.maxUnits)",      │
│  810 ─── "minUnits": "int               # The minimum timeunits this object needs to exist │
│                                             (1 - maxUnits",                     │
│  812 ─── "maxUnits": "int               # The maximum timeunits this object can have (minUnits - xx)" │
│  814 ─── "start": "date{} object        #                                       │
│  816 ─── "owner": "owner{} object       #                                       │
│  818 ─── "distribution": "int           # Defines the distribution requirements (default 1)", │
│  820 ─── "data": "[ data{} object ]     # An array of all the recorded and any triggers │
│  },                                                                             │
└─────────────────────────────────────────────────────────────────────────────────┘
```

FIG. 8

```
900
┌─────────────────────────────────────────────────────────────────────────────────┐
│  "data": {                                                                      │
│  902 ─── "name": "string                # Name",                                │
│  904 ─── "description": "string         # Description of data",                 │
│  906 ─── "dataType": "TEXT              # Declare the dataType - defines the contents of the object │
│                                         # NODE, TEXT, PPTX, DOCX, PDF, MPG, PNG, PERSON, │
│                                         PLACE ...",                             │
│  908 ─── "URI": "url                    # URL - if needed",                     │
│  910 ─── "triggerOn": "int              # Trigger when to make this data available", │
│  912 ─── "triggerOff": "int             # Trigger when to make this data unavailable" │
│  914 ─── "owner": "person{} object      # Owner of this data element",          │
│         ┌─────────────────────────────────────────────────────────────────────┐ │
│         │ "tbdVariable01": "TBD         # Value depending on dataType",        │ │
│         │ "tbdVariable02": "TBD         # Value depending on dataType",        │ │
│  916 ──┤ "tbdVariable0N": "TBD         # Value depending on dataType",        │ │
│         └─────────────────────────────────────────────────────────────────────┘ │
│  },                                                                             │
└─────────────────────────────────────────────────────────────────────────────────┘
```

FIG. 9

```
"person": {
    "email": "shortname           # email",
    "fname": "string               # first name",
    "lname": "string               # last name",
    "honorific": "string           # Honorific",
    "company": "string             # place of employment",
    "shortTitle": "string          # title",
    "longTitle": "string           # description of the user",
    "phone": "string               # phone number",
    "picURL": "url                 # url"
},
```

- 1002 — "email": "shortname  # email",
- 1004 — "fname": "string  # first name",
- 1006 — "lname": "string  # last name",
- 1008 — "honorific": "string  # Honorific",
- 1010 — "company": "string  # place of employment",
- 1012 — "shortTitle": "string  # title",
- 1014 — "longTitle": "string  # description of the user",
- 1016 — "phone": "string  # phone number",
- 1018 — "picURL": "url  # url"

FIG. 10

```
"state": {
    "errorState": "string          # OK, WARN, ERROR",
    "reason": "string              # (LOCKED, BLOCKED ...) Message",
    "date": "ISODate               # date changed"
},
```

- 1102 — "errorState": "string  # OK, WARN, ERROR",
- 1104 — "reason": "string  # (LOCKED, BLOCKED ...) Message",
- 1106 — "date": "ISODate  # date changed"

FIG. 11

```
"overlay": {
    "name": "string                # Name",
    "description": "string         # Description of overlay",
    "algorithm": "string           # Specify the algorithm used TIMED, NUMERIC ...",
    "contentList": ["content{}     #
},
```

- 1202 — "name": "string  # Name",
- 1204 — "description": "string  # Description of overlay",
- 1206 — "algorithm": "string  # Specify the algorithm used TIMED, NUMERIC ...",
- 1208 — "contentList": ["content{}  #

FIG. 12

| NAME | MINIMUM UNITS | MAXIMUM UNITS | DISTRIBUTION RATIO | CONTENT TRIGGER(S) | CHILDREN | |
|---|---|---|---|---|---|---|
| ROOT | 60 | 300 | 1 | | PART I<br>PART II | ←1402 |
| PART I | 30 | 240 | 2 | | INTRO<br>MAIN | ←1404 |
| PART II | 30 | 60 | 1 (DEFAULT) | | CONCLUSION | ←1406 |
| INTRO | 10 | 60 | 1 | 30 [0] | | ←1408 |
| MAIN | 20 | 180 | 3 | 30 [0]<br>60 [1]<br>90 [2] | | ←1410 |
| CONCLUSION | 30 | 60 | 1 | 30 [0]<br>60 [0 / DEL]<br>60 [1] | | ←1412 |

TIME-BASED ELEMENT MANAGEMENT IN A COMPUTER SYSTEM USING TEMPORAL NODE TREES

BACKGROUND

1. Field

The disclosure relates generally to an improved computer system and, more specifically, to a method, an apparatus, a system, and a computer program product for managing time-based elements using a tree structure.

2. Description of the Related Art

Physical systems and virtual systems that represent physical systems can be scaled. Scaling involves adding or removing items, components, or capabilities. A horizontal scaling strategy, a vertical scaling strategy, or both can be employed to scale these types of systems. For example, checkout stations in a retail store can be scaled to increase the capability of the retail store to handle the checkouts occurring in the retail store. Horizontal scaling can be employed by adding registers to increase the number of checkout stations or removing registers to decrease the number of checkout stations in the retail store.

As another example, in an information technology (IT) system, the capabilities of a server computer in the information technology system can be scaled by adding memory, central processing units, disk drives, or other hardware. This type of scaling is vertical scaling. Within the information technology system, additional server computers can be added to perform horizontal scaling.

SUMMARY

According to one embodiment of the present invention, a method manages time-based elements. A computer system identifies the time-based elements, wherein the time-based elements have time units. The computer system arranges nodes, representing the time-based elements, in a temporal node tree, wherein the nodes have the time units from corresponding time-based elements and a policy defines scaling of the nodes based on the time units allocated to the nodes.

According to another embodiment of the present invention, a computer system has a temporal node tree comprising nodes representing time-based elements that have time units. The nodes are arranged in the temporal node tree. The nodes have the time units from corresponding time elements and a policy defines scaling of the nodes based on the time units allocated to the nodes.

According to yet another embodiment of the present invention, a computer program product for managing time-based elements comprises a computer-readable-storage media, first program code, and second program code stored on the computer-readable storage media. The first program code runs to identify the time-based elements, wherein the time-based elements have time units. The second program code runs to arrange nodes, representing the time-based elements, in a temporal node tree, wherein the nodes have the time units from corresponding time-based elements and a policy defines scaling of the nodes based on the time units allocated to the nodes.

BRIEF DESCRIPTION OF THE DRAWINGS

FIG. 7 is a data structure for a child node in accordance with an illustrative embodiment;

FIG. 8 is a data structure for a content object in accordance with an illustrative embodiment;

FIG. 9 is a data structure for a data object in accordance with an illustrative embodiment;

FIG. 10 is a data structure for an owner in accordance with an illustrative embodiment;

FIG. 11 is a data structure for a state of a node in accordance with an illustrative embodiment;

FIG. 12 is a data structure for an overlay in accordance with an illustrative embodiment;

DETAILED DESCRIPTION

Figure 1:
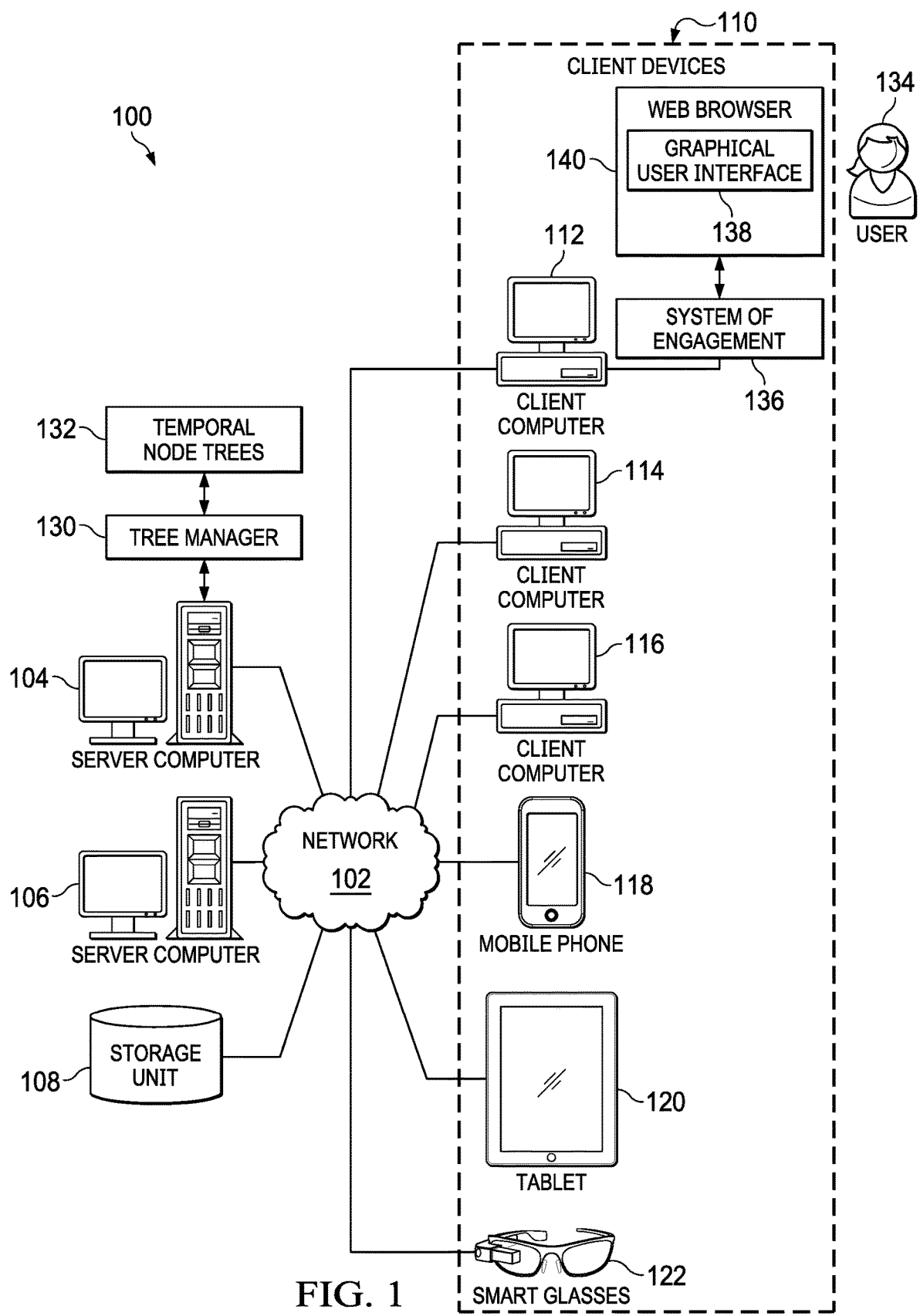
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, a special purpose computer, or some other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account one or more different considerations. For example, the illustrative embodiments recognize and take into account that time-based elements also can be scaled. The illustrative embodiments recognize and take into account that these time-based elements can be changed with respect to time. The illustrative embodiments recognize and take into account that examples of the time-based elements include topics on an agenda, meetings on a calendar, and other types of time-based elements.

The illustrative embodiments recognize and take into account that scaling the time for these types of elements can be difficult as compared to scaling physical systems. The illustrative embodiments recognize and take into account that currently scaling of time-based elements involves increasing or decreasing a time duration of each time-based element. The illustrative embodiments recognize and take into account that increasing or decreasing the time in the time-based elements can cause conflicts and that other considerations can be present.

For example, the illustrative embodiments recognize and take into account that an agenda contains a series of complicated time-based elements that occupy time in which each time-based element in the agenda has a relationship with the other elements as well as variable characteristics and limitations. For example, some time-based elements in an agenda for a meeting may have different content depending on the amount of time allocated to the agenda. Content such as topics for discussion, presentations, announcements, and other content may be added or removed from one or more time-based elements depending on the amount of time allocated to the time-based elements in the agenda.

The illustrative embodiments also recognize and take into account that a time-based element may be included or omitted based on the amount of time allocated to particular time-based elements in the agenda. For example, if insufficient time is present for a discussion on new business, that time-based element may be omitted from the agenda.

Consequently, the illustrative embodiments recognize and take into account that variable scaling of inter-related time elements is a different problem than the well understood transactional volumetric scaling of systems such as those in a retail store or in an information technology system. Thus, the illustrative embodiments provide a method, an apparatus, a system, and a computer program product for managing time-based elements. In one illustrative example, a computer system identifies the time-based elements, wherein the time-based elements have time units. The computer system arranges the nodes, representing the time-based elements, in a temporal node tree, wherein the nodes have the time units from corresponding time-based elements and wherein a policy defines scaling of the nodes in the temporal node tree.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as (but not limited to) mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In one illustrative example, tree manager 130 runs on server computer 104. In this illustrative example, tree manager 130 provides services for managing time-based elements using tree structures. In the illustrative example, time-based elements can be represented in temporal node trees 132. For example, tree manager 130 can provide processes for at least one of creating, updating, or managing temporal node trees 132.

The services provided by tree manager 130 can be accessed by users operating client devices 110. For example, user 134 can interact with system of engagement 136 running on client computer 112. System of engagement 136 provides graphical user interface 138 that enables user 134 to access services provided by tree manager 130. In this illustrative example, graphical user interface 138 can include web browser 140 in which system of engagement 136 is a plugin for web browser 140.

With tree manager 130, user 134 can perform at least one of creating, modifying, scaling, or other operations with respect to one or more of temporal node trees 132. The scaling of a temporal node tree is performed using a policy for the temporal node tree.

In one illustrative example, user 134 can create a temporal node tree and policy for the temporal node tree. In another illustrative example, user 134 can be a consumer that uses an already existing temporal node tree that has been published or distributed for use.

Although system of engagement 136 is shown as running on client computer 112, system of engagement 136 can also run on server computer 104 and send graphical user interface 138 to client computer 112 for display in web browser 140. In other illustrative examples, system of engagement 136 can be distributed between server computer 104 and client computer 112.

Figure 2:
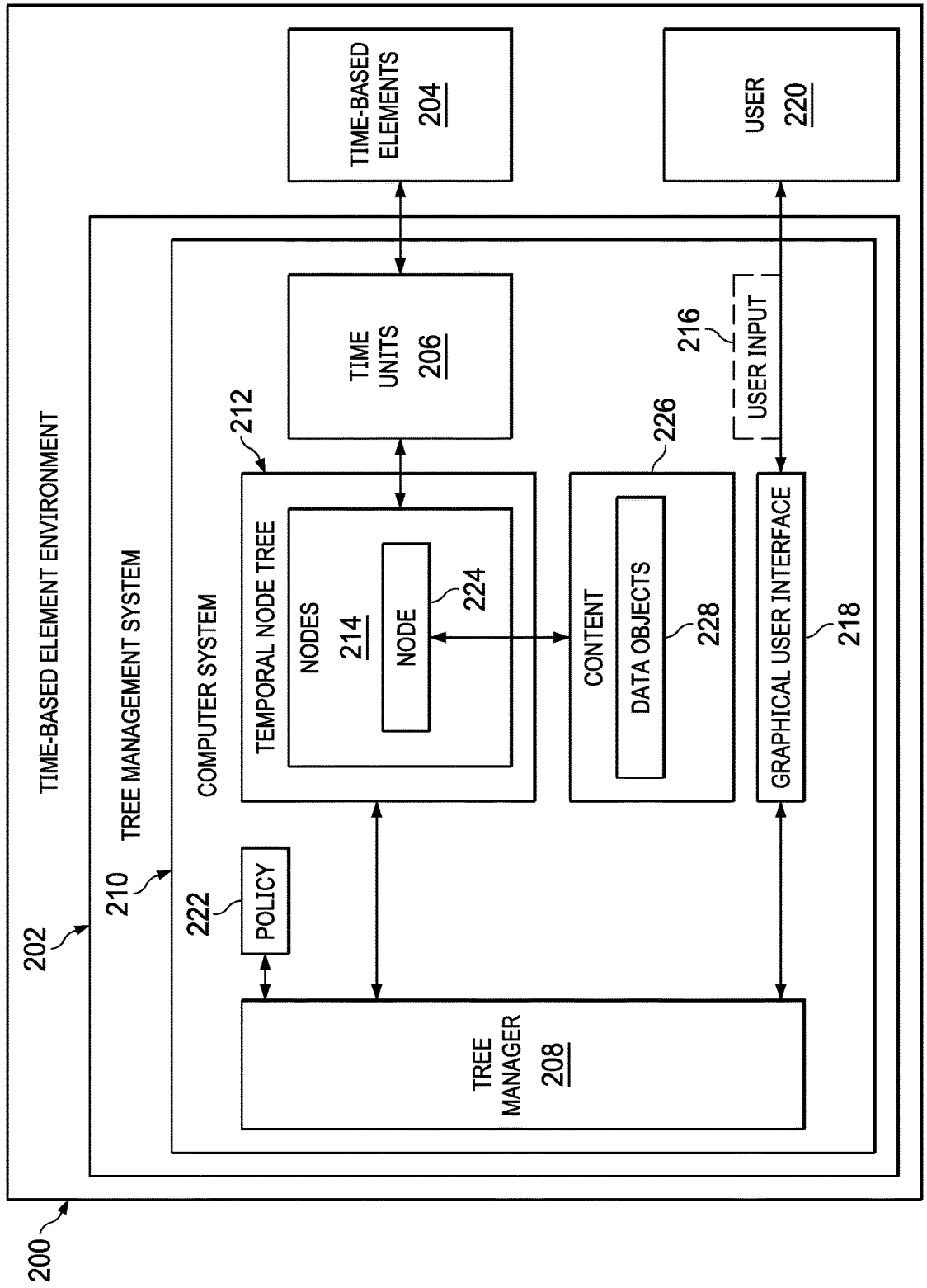
FIG. 2 is a block diagram of a time-based element environment in accordance with an illustrative embodiment.

With reference now to FIG. 2, a block diagram of a time-based element environment is depicted in accordance with an illustrative embodiment. In this illustrative example, time-based element environment 200 includes components that can be implemented in hardware such as the hardware shown in network data processing system 100 in FIG. 1.

In this illustrative example, tree management system 202 operates to manage time-based elements 204. As depicted, time-based elements 204 are items that occupy time or take time. Time-based elements 204 can take a number of different forms. For example, time-based elements 204 can be selected from at least one of a task, an event, a topic in an agenda, a meeting in a calendar, a manufacturing task, a presentation for a meeting, or other suitable items that occupy time.

As depicted, time-based elements 204 have time units 206. These time units can take various forms. For example, a time unit can be one minute, five minutes, 10 minutes, one second, 30 seconds, or some other amount of time.

In this illustrative example, tree management system 202 comprises tree manager 208 running on computer system 210 and temporal node tree 212. Tree manager 208 can be implemented in software, hardware, firmware, or a combination thereof. When software is used, the operations performed by tree manager 208 can be implemented in program code configured to run on hardware, such as a processor unit. When firmware is used, the operations performed by tree manager 208 can be implemented in program code and data and stored in persistent memory to run on a processor unit. When hardware is employed, the hardware may include circuits that operate to perform the operations in tree manager 208.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. When more than one data processing system is present in computer system 210, those data processing systems are in communication with each other using a communications medium. The communications medium can be a network. The data processing systems can be selected from at least one of a computer, a server computer, a tablet computer, or some other suitable data processing system.

In this illustrative example, tree manager 208 operates to manage time-based elements 204 using temporal node tree 212. As depicted, tree manager 208 enables at least one of creating, validating, deploying, scaling, and otherwise managing time-based elements 204 represented by nodes 214 in temporal node tree 212.

In this illustrative example, tree manager 208 can create temporal node tree 212 from an identification of time-based elements 204 having time units 206. In this illustrative example, time-based elements 204 can be identified through user input 216 received through graphical user interface 218 from user 220.

Tree manager 208 can arrange nodes 214 in temporal node tree 212 based on relationships between time-based elements 204. In this illustrative example, the arrangement and the relationships can be identified from user input 216. User input 216 can arrange nodes 214 in different hierarchies in temporal node tree 212 and create branches in temporal node tree 212 based on relationships that user 220 has identified for time-based elements 204. In other words, a branch between two nodes in nodes 214 represents a relationship between those two nodes.

In this illustrative example, nodes 214 have time units 206 from corresponding time-based elements in time-based elements 204. In other words, each node in nodes 214 has time units 206 for the time-based element in time-based elements 204 represented by the node.

Additionally, policy 222 is present for temporal node tree 212. Policy 222 defines how nodes 214 are handled in temporal node tree 212. For example, policy 222 defines scaling of nodes 214 based on time units 206 allocated to nodes 214. In this illustrative example, policy 222 contains a set of rules and also may include data used to apply the set of rules. As used herein, "a set of," when used with reference to items, means one or more items. For example, a set of rules is one or more rules.

In the illustrative example, policy 222 can be stored in a separate data structure or can be integrated within nodes 214. For example, node 224 in nodes 214 can contain a portion of policy 222 defining how time units 206 within node 224 affect node 224.

In defining the scaling of nodes 214, policy 222 defines how time units 206 can be allocated to nodes 214. In allocating time units 206, additions, deletions, or no changes can be made to time units 206 for a node in nodes 214. The amount of change in time units 206 for nodes 214 may not all change by the same amount between the different nodes in nodes 214. Policy 222 defines how much change in time units 206 can occur for nodes 214.

Additionally, in defining the scaling of nodes 214, policy 222 also can define how the allocation of time units 206 can affect content in nodes 214, how the allocation of time units 206 can cause a node to be removed from or added to temporal node tree 212, as well as how other properties of a node can be affected by the allocation of time units 206. Thus, the scaling of nodes 214 using policy 222 can include changing at least one of the allocation of time units 206, content 226, or which ones of nodes 214 are included in temporal node tree 212.

For example, when the allocation of time units 206 is changed, node 224 can be removed or, in some cases, added to nodes 214 if node 224 is not currently located in temporal node tree 212. As depicted, the use of node 224 in temporal node tree 212 can be contingent on the number of time units 206 allocated to node 224. For example, policy 222 can specify that node 224 is to be removed from temporal node tree 212 if the allocation of time units 206 to node 224 falls below some minimum number of time units 206.

As another example, if node 224 was previously removed, node 224 can be added back to temporal node tree 212 in its original position using policy 222 if an allocation of time units 206 exceeds some minimum number of time units 206.

In another illustrative example, node 224 in nodes 214 can have content 226 based on time units 206 allocated to node 224. Policy 222 can include rules for when or what content 230 is present in node 224 based on time units 206 that are allocated to node 224.

For example, tree manager 208 can change content 226 for node 224 in response to a change in the allocation of time units 206 to node 224 using policy 222. For example, the change in content 226 can be at least one of adding content 226, removing content 226, modifying content 226, or replacing content 226 with different content.

For example, content 226 can comprise a group of data objects 228. As used herein, "a group of," when used with reference to items means one or more items. For example, a group of data objects 228 is one or more of data objects 228. In this particular example, tree manager 208 uses policy 222 to determine when each data object in the group of data objects 228 is present in node 224 based on time units 206 allocated to node 224.

Figure 3:
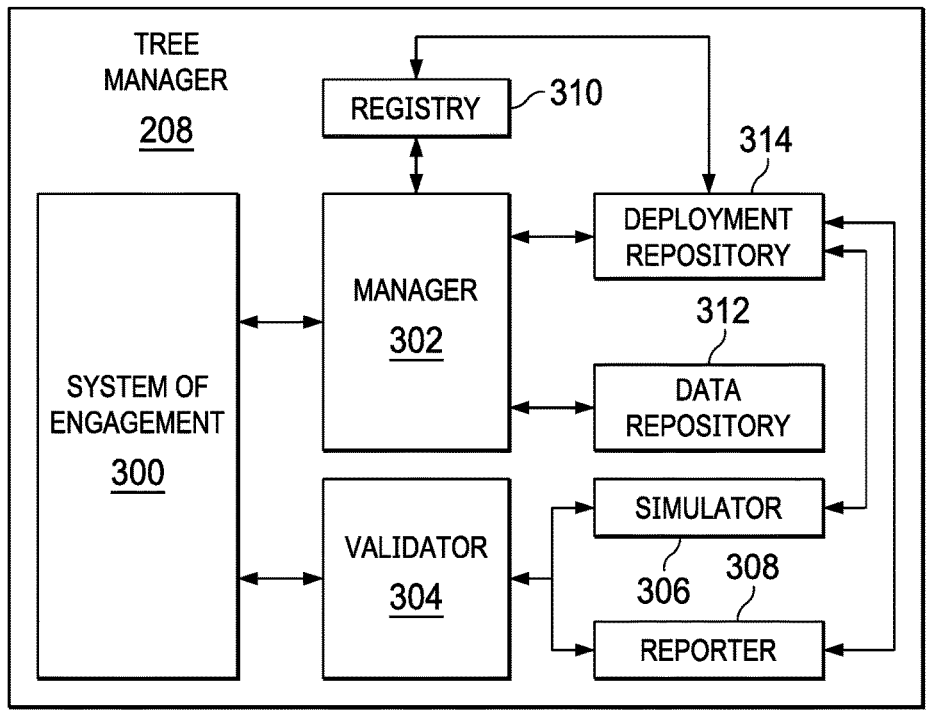
FIG. 3 is a block diagram of a tree manager in accordance with an illustrative embodiment.

With reference now to FIG. 3, a block diagram of a tree manager is depicted in accordance with an illustrative embodiment. In the illustrative examples, the same reference numeral may be used in more than one figure. This reuse of a reference numeral in different figures represents the same element in the different figures.

In this figure, an example of components that can be used to implement tree manager 208 in tree management system 202 is illustrated. In this example, tree manager 208 includes system of engagement 300, manager 302, validator 304, simulator 306, and reporter 308.

As depicted, system of engagement 300 provides an interface for a user, such as user 220 in FIG. 2, to enter user input to access services provided by tree manager 208. For example, system of engagement 300 includes graphical user interface 218 in FIG. 2 that is used by user 220 to interact with tree manager 208.

In the illustrative example, system of engagement 300 can be located on a separate computer from the computer on which manager 302, validator 304, simulator 306, and reporter 308 are located. For example, system of engagement 300 can be a front-end component located on a client device such as a desktop computer workstation and computer system 210 in FIG. 2, while manager 302, validator 304, simulator 306, and reporter 308 are located on a server computer in computer system 210.

In the depicted example, manager 302 includes services for handling temporal node trees. The services include at least one of creating, updating, and managing temporal node trees. The updating of temporal node trees includes scaling nodes for the temporal node trees based on changes to time units allocated to the temporal node trees.

As depicted, manager 302 hosts application programming interfaces (APIs) for accessing these different functions. Manager 302 provides APIs to perform node interactions, tree interactions, and simulation interactions. As depicted, the application programming interfaces include node APIs that can be used to retrieve, create, add, update, delete, locate, and perform other functions with respect to nodes. Tree APIs can be used to retrieve, add, create, delete, copy, locate, deploy, and perform other functions with respect to the temporal node trees. Validation APIs can be used to validate a temporal node tree. Simulation APIs can be used to create, run, stop, pause, delete, and perform other functions with respect to simulations. For example, these other functions also may include generating a report of the simulation and generating statistics.

In this illustrative example, validator 304 operates to validate temporal node trees. For example, a user can walk through a temporal node tree, test scaling options, and perform other tests or functions to validate the temporal node tree. For example, validator 304 can test for syntax and usage in a temporal node tree. Validator 304 can identify when symbolic linkages are present, whether a child node of a same parent node has a same name, and determine whether other potential conflicts or unreachable triggers or conditions are present. An unreachable trigger can be when a trigger for content cannot occur even with scaling time units in the temporal node tree. As another example, recursion can be impermissible within the temporal node trees.

As depicted, simulator 306 can operate to test various aspects of a temporal node tree. Simulator 306 can be especially useful when the temporal node tree becomes complex and will be for a user to validate using validator 304. Simulator 306 enables automated testing of various aspects of the temporal node tree, including validation.

For example, simulator 306 can provide results from scaling a temporal node tree by changing an allocation of time units. Further, in addition to providing automated validation, simulator 306 can also simulate results from changing the allocation of the time units to various portions of the temporal node tree. For example, simulator 306 can simulate at least one of individual nodes, a set of nodes, or all of the nodes in the temporal node tree.

For example, the adjustment of time units allocated to nodes may be easier for a user to visualize and understand as compared to how the change in the allocation of time units affects content in a node. Simulator 306 can provide a visualization while running a simulation to enable a user to see changes in the content when the time units allocated to the nodes in the temporal node tree are changed.

For example, a user can add multiple data objects for content in a node. Different data objects can be present in the node as content based on rules in the policy referred to as triggers. These triggers can be rules identifying when a data object is present in a node based on the time units allocated to the node. As a result, the content may be removed, added, or replaced in the node based on the time units that are allocated to the node. As the complexity of the temporal node tree grows, using simulator 306 to simulate what content is present in different nodes in the temporal node tree can be especially useful to a user to ensure that the temporal node tree behaves as desired with different allocations of time units. The user can change rules such as triggers, data objects, and other parameters based on running the simulation.

As depicted, reporter 308 operates to generate a report showing the results of testing a temporal node tree. For example, reporter 308 can generate reports from testing performed by simulator 306. Further, reporter 308 can also generate reports on usage statistics for deploying temporal node trees.

In this illustrative example, tree manager 208 can utilize different types of storage for managing temporal node trees. For example, registry 310 allows for recording deploying temporal node trees when the temporal node trees become available for use by users. Registry 310 can be used to track usage, verification, and other metadata about deployed temporal node trees. Data repository 312 can be employed by user to create, edit, store, and manage the temporal node trees. Further, data repository 312 can include various security components that may be required for storing the data. Deployment repository 314 can store deployed temporal node trees. Deployed temporal node trees are temporal node trees that are ready for use and are published, distributed, or otherwise available for use by other users.

Figure 4:
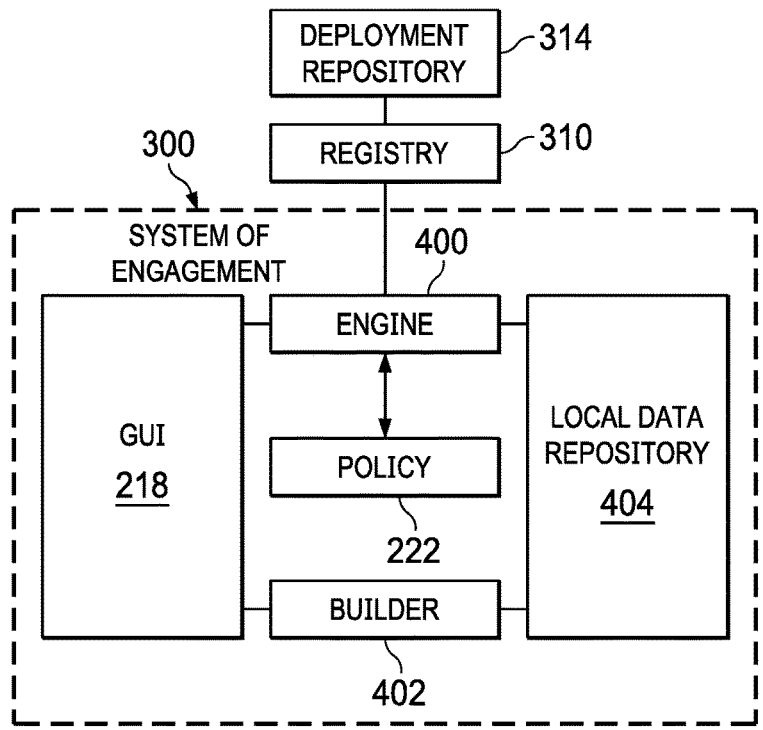
FIG. 4 is a block diagram of a system of engagement in accordance with an illustrative embodiment.

Turning to FIG. 4, a block diagram of a system of engagement is depicted in accordance with an illustrative embodiment. This figure illustrates examples of components that can be used to implement system of engagement 300 in FIG. 3. As depicted, system of engagement 300 includes graphical user interface 218, engine 400, and builder 402.

In this illustrative example, graphical user interface 218 receives user input and displays information such as visualizations of temporal node trades, reports, simulations, and other information to a user. Engine 400 includes processes to scale a temporal node tree using policy 222.

In this illustrative example, scaling is the change to nodes in a temporal node tree. The change can be in response to changes in the allocation of time units to some or all of the nodes in the temporal node tree. Scaling can be performed for a single node, a group of nodes, or the entire temporal node tree.

As depicted, engine 400 also updates nodes in the temporal node tree to reflect the change in the allocation of time units to the nodes. Further, engine 400 can also update the nodes to reflect changes in content in the nodes based on the change in the allocation of time units to the nodes using policy 222. The rules for the content in policy 222 can be referred to as triggers. Additionally, the updates to the nodes can include removing a node based on the change in the allocation of time units to the node.

When a node is removed, the time units allocated to the node can be handled in a number of different ways. For example, the time units can be given to the parent node of the node for allocation and then allocated to other nodes based on a policy to distributing time units.

As depicted, builder 402 enables creating a temporal node tree in response to receiving user input. A new temporal node tree can be stored in local data repository 404. The user input can be used to place nodes in a temporal node tree, defined rules, change rules, create branches, add content, or other actions with respect to the temporal node tree.

The different components illustrated for system of engagement 300 can be distributed to more than one data processing system. For example, graphical user interface 218 can be located on a computer or device for the user. Engine 400, builder 402, and local data repository 404 can be located on a server computer. In other illustrative examples, one or more of these components can also reside on the computer or device for the user.

In one illustrative example, one or more technical solutions are present that overcome a technical problem with managing time-based elements. As a result, one or more technical solutions may provide a technical effect of reducing complexity in managing time-based elements. In the illustrative example, one or more temporal solutions are present in which temporal node trees are used to represent time-based elements. In the illustrative example, one or more technical solutions are present in which changes in time units allocated to the nodes result in scaling of the temporal node tree using policy.

Computer system 210 can be configured to perform at least one of the steps, operations, or actions described in the different illustrative examples using software, hardware, firmware, or a combination thereof. As a result, computer system 210 operates as a special purpose computer system in which tree manager 208 in computer system 210 enables managing of time-based elements 204 using temporal node tree 212 and policy 222. Temporal node tree 212 includes nodes 214 that represent time-based elements 204. Nodes 214 have time units 206 that are assigned based on time units 206 from corresponding time-based elements in time-based elements 204. In particular, tree manager 208 transforms computer system 210 into a special purpose computer system as compared to currently available general computer systems that do not have tree manager 208.

In the illustrative example, the use of tree manager 208 in computer system 210 integrates processes into a practical application for managing time-based elements 204 using temporal node tree 212 that increases the performance of computer system 210 in propagating changes to time units 206 allocated to time-based elements 204 represented by nodes 214 using policy 222. Policy 222 is used by tree manager 208 to scale nodes 214 in temporal node tree 212. Changes to nodes 214 reflect how time-based elements 204 are changed in response to changes in an allocation of time units 206. In other words, tree manager 208 in computer system 210 is directed to a practical application of processes integrated into tree manager 208 in computer system 210 that can be used to create, modify, and scale temporal node tree 212.

The illustration of time-based elements environment 200 in the different components in FIGS. 2-4 are not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, simulator 306 may be omitted in some implementations of tree manager 208. In yet another illustrative example, validator 304 and simulator 306 can be combined into a single component.

Figures 5, 6:
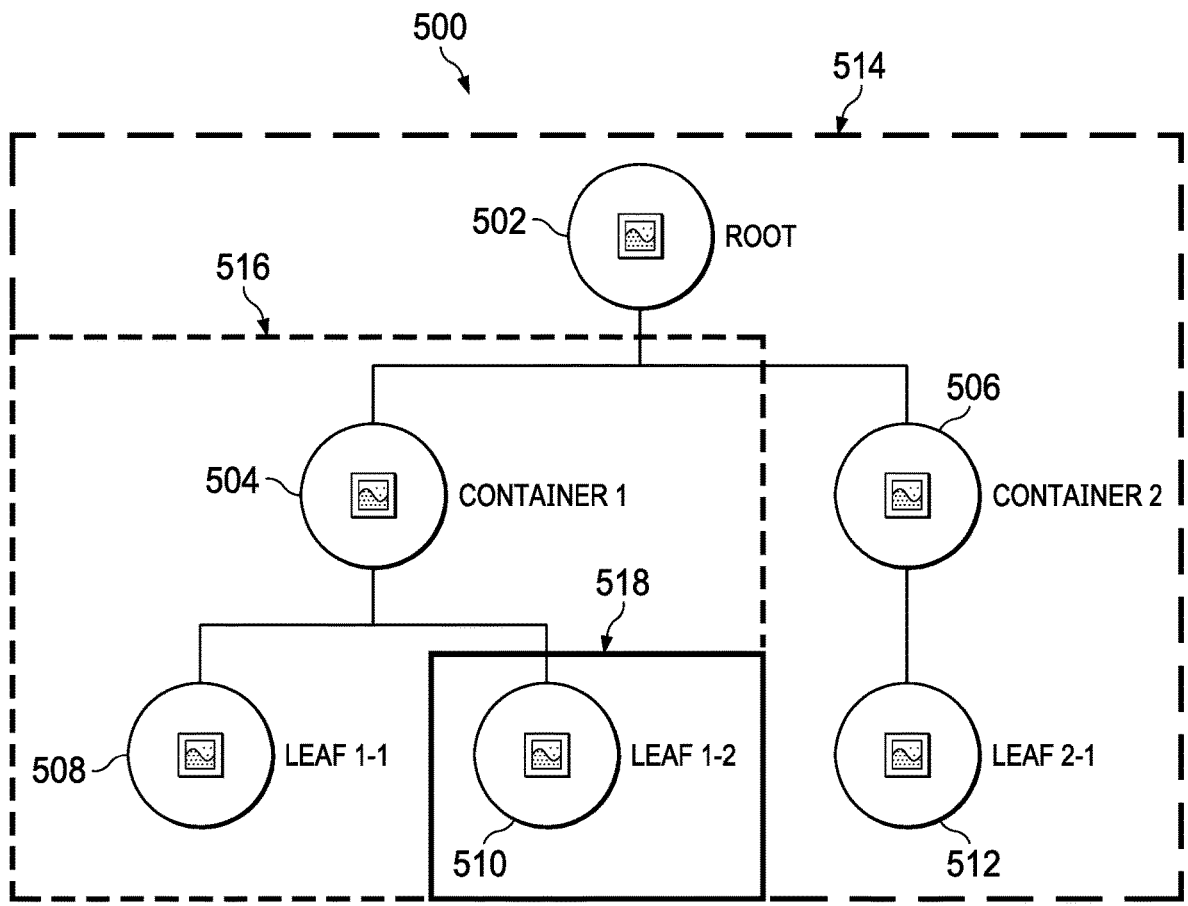
FIG. 5 is a temporal node tree in accordance with an illustrative embodiment.
FIG. 6 is a data structure for a root node in accordance with an illustrative embodiment.

Referring to FIG. 5, a temporal node tree is depicted in accordance with an illustrative embodiment. Temporal node tree 500 is an example of an implementation for temporal node tree 212 shown in block form in FIG. 2. As depicted, temporal node tree 500 includes root node 502, container node 504, container node 506, leaf node 508, leaf node 510, and leaf node 512.

In this illustrative example, root node 502 is the starting node in temporal node tree 500. A container node is a node that has child nodes that branch off of the container. As depicted, container node 504 has leaf node 508 and leaf node 510. Container node 506 has leaf node 512. These nodes branching off of container node 504 and container node 506 are leaf nodes because these nodes do not have child nodes that branch from them.

In this depicted example, container node 504 and container node 506 do not have content. A node with a child node and content is referred to as a content-container node (not shown).

As depicted, temporal node tree 500 is designed to enable scaling at different levels. For example, scaling nodes within section 514 involves scaling all of temporal node tree 500. Scaling nodes within section 516 involves scaling a subset of nodes in temporal node tree 500. As another example, scaling leaf node 510 in section 518 involves scaling a single node.

FIGS. 6-12 are examples of data structures that can be used to store and organize information about time-based elements in nodes for a temporal node tree. These data structures also integrate a policy for scaling a portion or all of a temporal node tree.

With reference to FIG. 6, a data structure for a root node is depicted in accordance with an illustrative embodiment. Root node data structure 600 contains data for a root node in a temporal node tree. Root node data structure 600 includes identifier 602, start 604, owner 606, state 608, children 610, content 612, overlay 614, current allocation 616, allocated units 618, minimum units 620, and maximum units 622.

As depicted, identifier 602 is a unique identifier used to identify the root node. Start 604 identifies when the root node for the temporal node tree was created. Owner 606 identifies the owner of the temporal node tree. Owner 606 can point to an object identifying the owner. State 608 points to an object identifying the current state of the root node. Children 610 identifies one or more child nodes below the root node. Children 610 can be an array of unique identifiers for child nodes.

When content is present in the root node, content 612 points to an object defining the content for the renewed. Overlay 614 points to an object that can be used to scale the entire temporal node tree. Overlay 614 points to an object or objects that are applied to an entire temporal node tree as the temporal node tree is scaled. Overlay 614 can process content. For example, overlay 614 can add a survey to the end of every node the contains specific content. In another illustrative example, overlay 614 can place children nodes between existing nodes, such as adding nodes for breaks in a temporal node tree for an agenda.

As depicted, current allocation 616 identifies the number of time units currently allocated to the root node. Allocated unit 618 identifies the number of time units allocated to child nodes and content. In this example, the content is the content in child nodes which the parent node contains. Minimum units 620 identifies a minimum number of time units that the node needs to exist, and maximum units 622 identifies a maximum number of time units that can be allocated to the root node.

Turning next to FIG. 7, a data structure for a child node is depicted in accordance with an illustrative embodiment. Child node data structure 700 is an example of a data structure that can be used to define a child node in a temporal node tree. As depicted, child node data structure 700 includes identifier 702, parent 704, previous 706, next 708, lock 710, can move 712, priority 714, current allocation 716, allocated units 718, minimum units 720, maximum units 722, start 724, owner 726, state 728, children 730, content 732, overlay 734, and distribution 736.

As depicted, identifier 702 is a unique identifier used to uniquely identify the child node. Parent 704 points to the parent node for the child node; previous 706 points to a previous node to which the child node is connected; and next 708 points to the node below the child node.

Lock 710 indicates whether the child node can be moved or altered. If lock 710 is active, the child node cannot be moved or changed. Can move 712 indicates whether the child node can be moved within the temporal node tree.

In this illustrative example, priority 714 is used if a conflict is present in allocating time units. For example, priority 714 can be an integer. Different nodes can have different priorities such that when the conflict is present, priorities identified by the integers can be compared to determine which node should receive a time unit.

As depicted, current allocation 716 identifies the current number of time units allocated to the child node. Allocated units 718 identify the number of time units distributed to the child nodes of the child node and content. Minimum units 720 identifies the minimum time units that the child node needs to exist in the temporal node tree, and maximum units 722 identifies the maximum number of time units that can be allocated to the child node.

In this example, start 724 identifies the date when the child node was created. The date comprises the month, day of the month, and year and can also include the time. Owner 726 points to an object that identifies the owner of the child node. State 728 points to an object identifying the current state of the child node.

Children 730 points to any child nodes on the next lower level in the temporal node tree that are connected to the current child node. Content 732 points to an object describing content for the child node. Overlay 734 points to an object used to scale the temporal node tree. Distribution 736 identifies distribution requirements for the child node. For example, a distribution of 1 means that the node receives 1 time unit with respect to the distribution of time units to nodes. A distribution of 2 means that the node receives 2 time units and another node with a distribution of 1 receives 1 time unit.

Thus, distribution 736 describes how time units are distributed to child nodes below the current node. The distribution ratio of a child node determines what portion of the time units distributed by the parent node is distributed to each child node.

With reference now to FIG. 8, a data structure for a content object is depicted in accordance with an illustrative embodiment. Content object 800 defines content that can be in a node. Content may be present in a node based on how time units are allocated to the node. As depicted, content object 800 includes identifier 802, parent 804, lock 806, current allocation 808, minimum units 810, maximum units 812, start 814, owner 816, distribution 818, and data 820.

Identifier 802 is a unique identifier for content object 800. Parent 804 identifies the node to which content can be present. Lock 806 dictates whether this data structure can be changed or moved. Current allocation 808 identifies the current number of time units provided to this data structure. Minimum units 810 identifies a minimum number of units that an object needs to exist while maximum units 812 identifies a maximum number of time units that the object can have.

In this example, start 814 identifies when the object was created, owner 816 identifies the owner of this object, and distribution 818 defines the distribution requirements. Data 820 identifies data objects that can be part of the content for a node.

In FIG. 9, a data structure for a content object is depicted in accordance with an illustrative embodiment. As depicted, data object data structure 900 is an example of a data structure describing data objects that can be used by content as described using content object 800 in FIG. 8. Content object 800 can include one or more data objects described using data object data structure 900. In this illustrative example, data object data structure 900 includes name 902, description 904, data type 906, universal resource identifier (URI) 908, trigger on 910, trigger off 912, owner 914, and variables 916.

As depicted, name 902 is the name of the data object that can be used to reference this data structure. Description 904 describes the data in the data object. Data type 906 identifies the type or types of data that can be present in the data object. Universal resource identifier 908 is an optional identifier and can be used to identify the location of the data.

In this illustrative example, trigger on 910 is a rule in a policy, such as policy 222 in FIG. 2, that defines when the data in the data object is available. Trigger off 912 is a rule in a policy that defines when data in the data object is unavailable. Owner 914 identifies the owner of the object. Variables 916 contain values for variables for data in the data object.

Referring next to FIG. 10, a data structure for an owner is depicted in accordance with an illustrative embodiment. In this illustrative example, owner data structure 1000 identifies the owner of the various objects such as a root node, a child node, content, and a data object. In this illustrative example, owner data structure 1000 includes email 1002, first name 1004, last name 1006, honorific 1008, company 1010, short title 1012, long title 1014, phone 1016, and picture 1018.

With reference to FIG. 11, a data structure for a state of a node is depicted in accordance with an illustrative embodiment. In this illustrative example, state data structure 1100 includes error state 1102, reason 1104, and date 1106. Error state 1102 indicates the state of the object. The state can be, for example, "okay," "warning," "error," or some other identifier for the state of the object. Reason 1104 identifies the reason for an error being present such as the node object being locked or blocked. Date 1106 identifies the date when the state of the object changed.

Referring to FIG. 12, a data structure for an overlay is depicted in accordance with an illustrative embodiment. Overlay data structure 1200 includes name 1202, description 1204, algorithm 1206, and content list 1208. Name 1202 is the name of the overlay that can be used to reference this data structure. Description 1204 describes the overlay. Algorithm 1206 identifies the algorithm that is used to perform the overlay scaling for the entire temporal node tree. Content list 1208 identifies contents in the temporal node tree. With overlay scaling, an algorithm can be used to add breaks to an agenda as the nodes grow beyond a threshold. For example, algorithm 1206 can add a break node once the temporal node tree is greater than a threshold number of nodes. The context refers to what would be in the overlay nodes.

The illustration of the different data structures and FIGS. 6-12 are presented as an illustration of one manner in which data can be organized for a temporal node tree. These illustrations are not meant to limit the manner in which the data in a temporal node tree can be stored or organized. For example, the owner of a number object can be identified within the data structure for that number object rather than in a separate data structure.

Figures 13, 14:
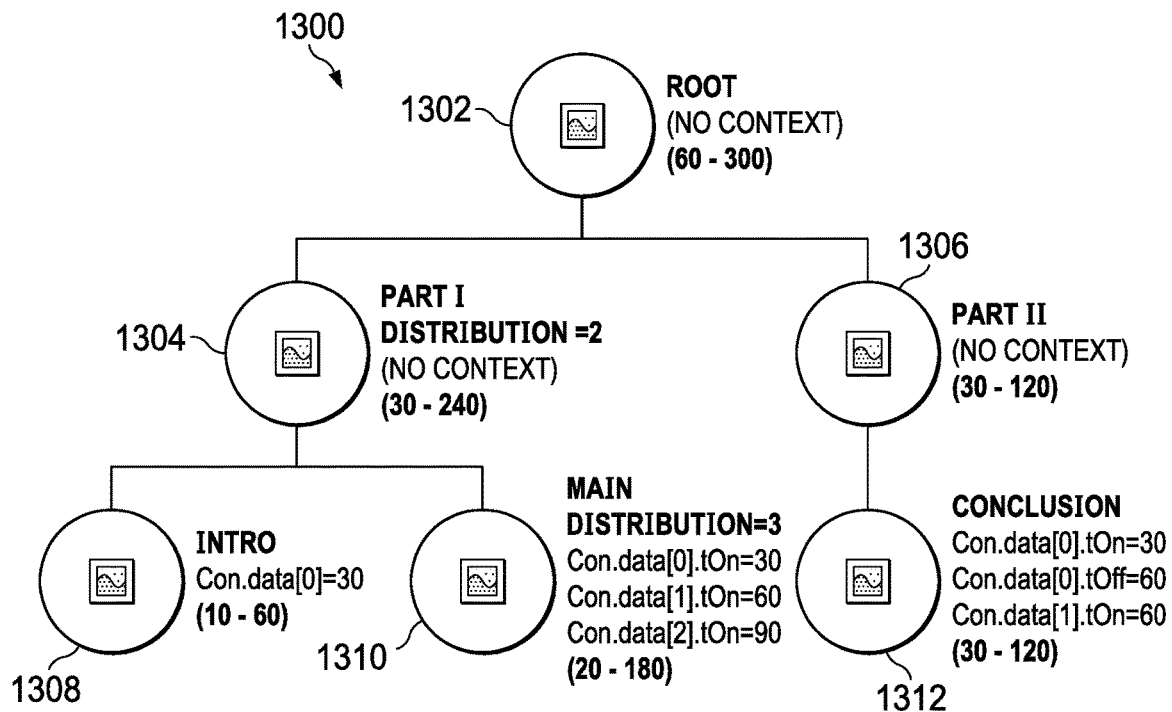
FIG. 13 is a temporal node tree for a presentation in accordance with an illustrative embodiment.
FIG. 14 is a table of values for nodes in the temporal node tree for a presentation in accordance with an illustrative embodiment.

With reference to FIG. 13, a temporal node tree for a presentation is depicted in accordance with an illustrative embodiment. Temporal node tree 1300 is an example of one implementation for temporal node tree 212 in FIG. 2. As depicted, temporal node tree 1300 includes nodes that represent time-based elements for a presentation. In this example, temporal node tree 1300 comprises Root node 1302, Part I node 1304, Part II node 1306, Intro node 1308, Main node 1310, and Conclusion node 1312.

As depicted, Part I node 1304 and Part II node 1306 are child nodes that branch off of Root node 1302 and are for the two parts of the presentation. Intro node 1308 and Main node 1310 are child nodes branching off of Part I node 1304. Conclusion node 1312 is a child node branching off of Part II node 1306.

Turning to FIG. 14, a table of values for nodes in a temporal node tree for a presentation is depicted in accordance with an illustrative embodiment. As depicted, table 1400 contains information describing the nodes in temporal node tree 1300 in FIG. 13. The information shown in table 1400 is for purposes of illustrating the information and rules for policy and nodes. The information and rules depicted in table 1400 can be organized using data structures such as the data structures shown in FIGS. 6-12.

In this illustrative example, table 1400 includes a row for nodes in temporal node tree 1300 and columns identifying information about nodes in temporal node tree 1300. In this illustrative example, the rows comprise row 1402 corresponding to Root node 1302, row 1404 corresponding to Part I node 1304, row 1406 corresponding to Part II node 1306, row 1408 corresponding to Intro node 1308, row 1410 corresponding to Main node 1310, and row 1412 corresponding to Conclusion node 1312.

The columns comprise name 1414, minimum units 1416, maximum units 1418, distribution ratio 1420, content trigger 1422, and children 1424. Minimum units 1416, maximum units 1418, distribution ratio 1420, content trigger 1422 are illustrative examples of rules for a policy such as policy 222 in FIG. 2. These rules can be used to scale nodes in temporal node tree 1300. In this table, the scaling is performed to allocate the time units in the nodes and to identify content that can be present in the nodes.

In this illustrative example, name 1414 is the name of a node in temporal node tree 1300 in FIG. 13. Minimum units 1416 is the minimum number of time units a node can have and exist, and maximum units 1418 is the maximum number of time units that can be allocated to the node. Children 1424 identifies child nodes.

Distribution ratio 1420 identifies how time units are allocated to a node. For example, a distribution ratio of 1 means that the node receives 1 time unit with respect to the distribution of time units to nodes. A distribution ratio of 2 means that the node receives 2 time units and another node with a distribution ratio of one receives 1 time unit.

Content trigger 1422 contains rules for a policy defining when content is present in a node. Further, content trigger 1422 also can indicate when data is present or added for the content in a node.

For example, in row 1410 for Main node 1310, an allocation of 30 time units results in data [0] being added as content for Main node 1310. When 60 time units are present in main node, data [1] is added to the content for Main node 1310. This data is in addition to data [0]. When 90 time units are allocated to Main node 1310, data [2] is added as additional data for the content for Main node 1310.

As another example, in row 1412 for Conclusion node 1312, an allocation of 30 time units results in data [0] being present in Conclusion node 1312. An allocation of 60 time units results in data [0] being removed and data [1] being added to Conclusion node 1312.

The illustration of temporal node tree 1300 in FIG. 13 and information for temporal node tree 1300 in table 1400 in FIG. 14 are presented for purposes of illustrating one manner in which a temporal node tree can be implemented as well as a practical use of a temporal node tree. Further, description of the different actions performed on temporal node tree 1300 are examples of steps that can be performed by tree manager 208 in FIGS. 2-3 in which the steps or parts of processes are implemented into a practical application for managing time-based elements using temporal node trees.

This example is not meant to limit the manner in which other illustrative examples can be implemented. For example, temporal node tree 1300 can include additional nodes such as an intermission, a question-and-answer, or other time-based elements for a presentation. In yet another illustrative example, a temporal node tree can be used for meetings in a calendar, an agenda for a meeting, a programming project, or other types of activities, events, or items that include time-based elements.

Figure 15:
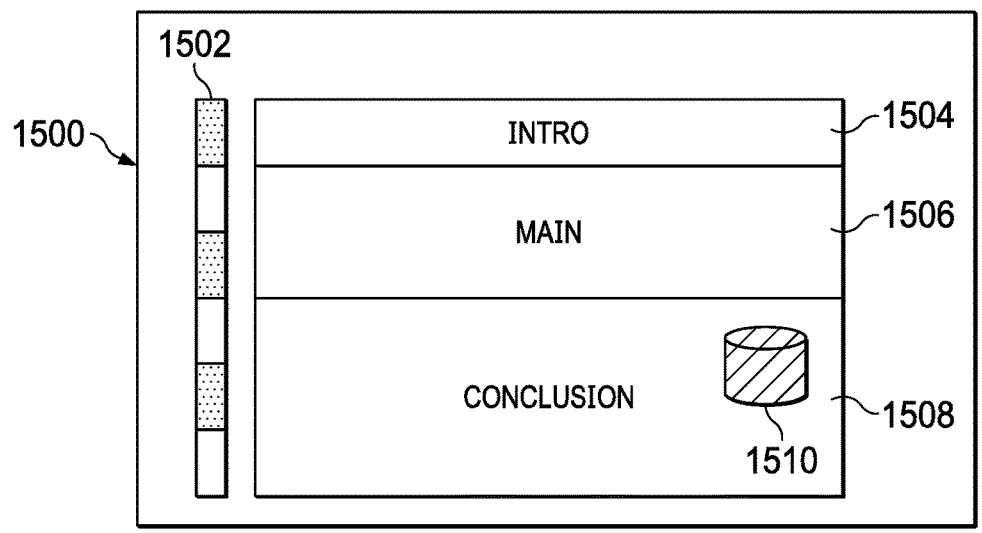
FIG. 15 is a display of an allocation of time units for nodes in a temporal node tree in accordance with an illustrative embodiment.

With reference next to FIG. 15, a display of an allocation of time units for nodes in a temporal node tree is depicted in accordance with an illustrative embodiment. In the illustrative example, display 1500 can be displayed in graphical user interface 218 in FIG. 2. In this illustrative example, a display of time units allocated to nodes in temporal node tree 1300 is shown. As depicted in this figure, nodes that have or can have content are displayed for visualization. In this depicted example, the nodes are Intro node 1308, Main node 1310, and Conclusion node 1312. In this example, the container nodes, Part I node 1304, and Part II node 1306, without content are not visualized in display 1500. Further, this visualization in display 1500 can be displayed in graphical user interface 218 in FIG. 2 during a simulation performed using simulator 306 in FIG. 3.

As depicted, segmented line 1502 in display 1500 identifies time units. Each segment is 10 time units in this illustrative example.

Intro section 1504 represents Intro node 1308; Main section 1506 represents Main node 1310; and Conclusion section 1508 represents Conclusion node 1312 in temporal node tree 1300. In this initial allocation of time units, Intro section 1504 shows an allocation of 10 time units to Intro node 1308. Main section 1506 shows an allocation of 20 time units to Main node 1310, and Conclusion section 1508 shows an allocation of 30 time units to Conclusion node 1312. In this illustrative example, the allocation of 30 time units results in data being present in Conclusion node 1312 as shown by content icon 1510.

In display 1500, the time units distributed from Part I node 1304 and Part II node 1306 into the child nodes are equally allocated and distributed based on minimum requirements for the two container nodes having 30 time units each. Content icon 1510 is an indication that content is present in conclusion node 1312, while the presence of content for the other nodes, Intro node 1308 and Main node 1310, have not yet been triggered as shown in display 1500.

In this example, additional time units can be added to temporal node tree 1300 using policies in table 1400 for temporal node tree 1300. For example, 60 time units can be added to scale temporal node tree 1300.

When a time unit is distributed to Root node 1302, the time unit will be distributed based on priority for the child nodes, Part I node 1304 and Part II node 1306. The child nodes have a total distribution count of 3. As a result, time units are distributed based on priority, or if all priorities are equal, process waits to receive 3 time units to allocate time units to Part I node 1304 and Part II node 1306.

Once Root node 1302 receives 3 time units, 2 time units are allocated to Part I node 1304 and 1 time unit is allocated to Part II node 1306. The time units in each of these nodes will be distributed to the child nodes of Part I node 1304 and Part II node 1306. In this illustrative example, Part I node 1304 does not distribute any time units because child nodes of Part I node 1304 requires 4 time units to be available for distribution. Once Part I node 1304 has 4 time units, those time units will be distributed from Part I node 1304 to the child nodes, Intro node 1308 and Main node 1310.

In this depicted example, Intro node 1308 receives an allocation of time units. This node only has content and the time units are applied to the content as set out in row 1408 in table 1400 in FIG. 14. Intro node 1308 has a trigger at 30 time units, which results in data for content being present in Intro node 1308.

As depicted, Main node 1310 only has content as seen in row 1410 in table 1400 in FIG. 14. As a result, all of the time units are applied to the content. In this example, Main node 1310 has several triggers for content as seen in row 1410 in table 1400. In this illustrative example, content is added at each 30 time unit increments: 30, 60, and 90.

In this illustrative example, time units from Part II node 1306 are distributed to the only child of Part II node 1306, Conclusion node 1312. In this illustrative example, content for Conclusion node 1312 is different because the data for the content changes at selected time units allocations. As depicted, data [0] is added when 30 units are allocated to Conclusion node 1312. Then, data [0] is triggered to be removed at 60 time units seen in row 1412 for Conclusion node 1312 in table 1400 in FIG. 14. Additionally, a trigger is present at 60 time units to add a data [1] to the content for Conclusion node 1312. In other words, the data for content in this node changes when 60 or more time units are allocated to Conclusion node 1312.

The illustration of temporal node tree 1300 in FIG. 13 and information for temporal node tree 1300 in table 1400 in FIG. 14 are presented for purposes of illustrating one manner in which a temporal node tree can be implemented as well as a practical use of a temporal node tree. Further, description of the different actions performed on temporal node tree 1300 shows examples of steps that can be performed by tree manager 208 in which the steps or parts of processes may be implemented into a practical application for managing time-based elements using temporal node trees. This example is not meant to limit the manner in which other illustrative examples can be implemented. For example, temporal node tree 1300 can include additional nodes such as an intermission, a question-and-answer, or other time-based elements for a presentation. In yet another illustrative example, a temporal node tree can be used for meetings in a calendar, an agenda for a meeting, a programming project, or other types of activities, events, or items that include time-based elements.

Figure 16:
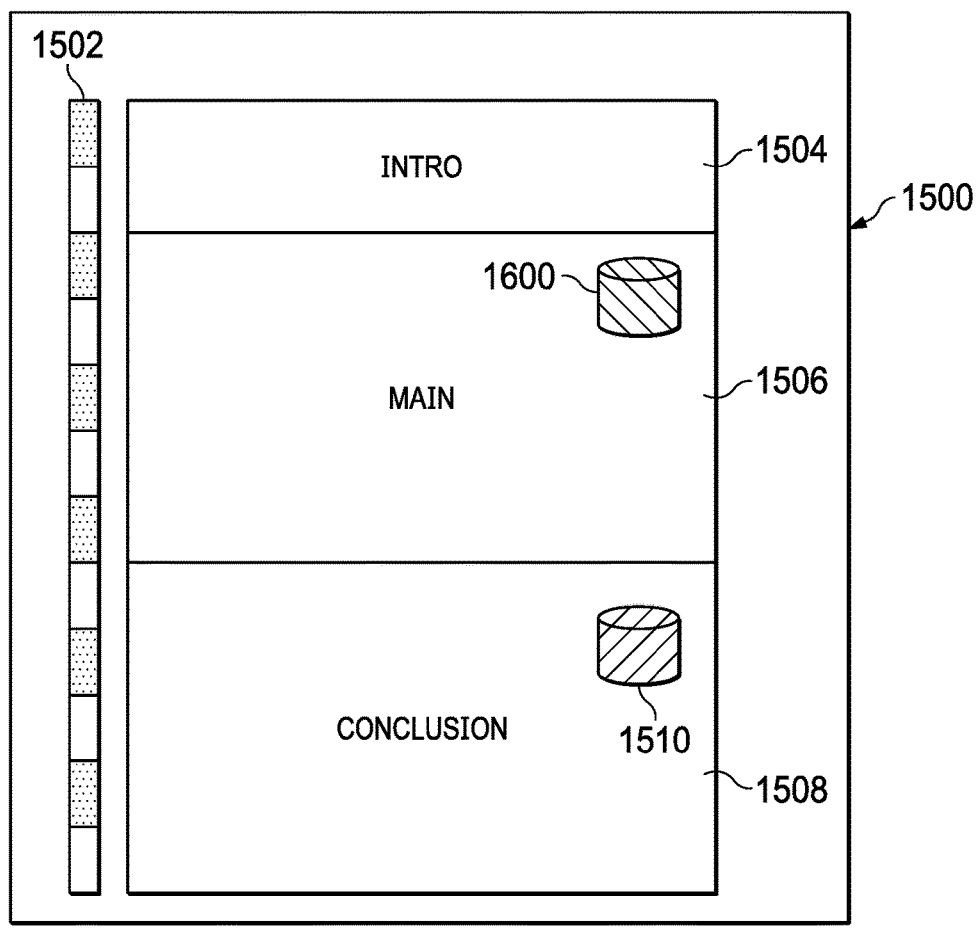
FIG. 16 is a display of allocations of time units for nodes in a temporal node tree in accordance with an illustrative embodiment.

In FIG. 16, a display of allocations of time units for nodes in a temporal node tree is depicted in accordance with an illustrative embodiment. As shown in FIG. 16, display 1500 changes to provide visualization of the addition 60 time units to temporal node tree 1300. Intro section 1504 for 1 node 1308 has 20 time units, Main section 1506 for Main node 1310 has 50 time units, and Conclusion section 1508 for Conclusion node 1312 has 50 time units. Additionally, content icon 1600 is display to show that content is now present in Main node 1310.

In display 1500 in FIG. 16, different distributions are at both the root and child level. A 2:1 distribution of time units occurs at the root level, in Part I node 1304 and Part II node 1306, respectively and a 3:1 distribution occurs with the child nodes of Part I node 1304 into Main node 1310 and Intro node 1308, respectively. Further, data for content in Main node 1310 is not triggered to be present until after 30 time units were allocated to the main mode.

Display 1500 in FIG. 15 and FIG. 16 is presented to show one manner in which information about the allocation of time units and the presence of content in nodes can be displayed in graphical user interface 218 in FIG. 2. This illustration is not meant to limit the manner in which other displays can be implemented.

Figure 17:
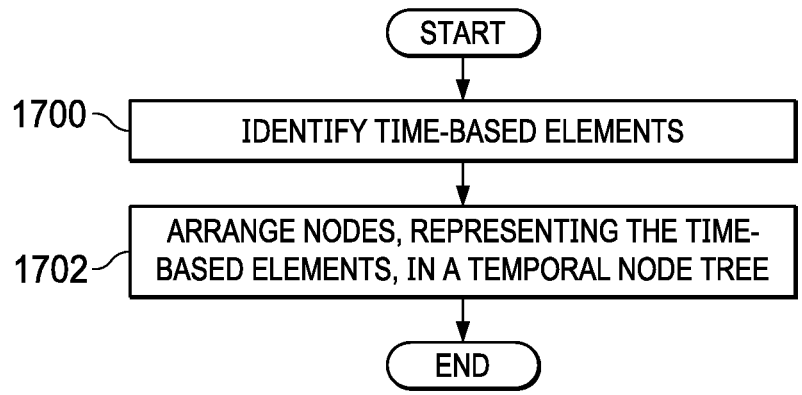
FIG. 17 is a flowchart of a process for managing time-based elements in accordance with an illustrative embodiment.

Turning next to FIG. 17, a flowchart of a process for managing time-based elements is depicted in accordance with an illustrative embodiment. This process manages time-based elements using a temporal node tree. The process in FIG. 17 can be implemented in hardware, software, or both. When implemented in software, the process can take the form of program code that is run by one of more processor units located in one or more hardware devices in one or more computer systems. For example, the process can be implemented in tree manager 208 in computer system 210 in FIG. 2.

The process begins by identifying time-based elements (step 1700). The time-based elements have time units. The process arranges nodes, representing the time-based elements, in a temporal node tree (step 1702). The process terminates thereafter. The nodes have the time units from corresponding time-based elements and a policy that defines scaling of the time units in the nodes.

Figure 18:
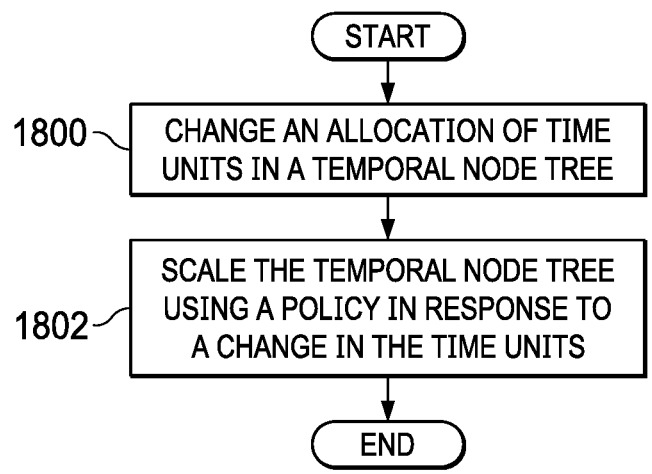
FIG. 18 is a flowchart of a process for scaling a temporal node tree in accordance with an illustrative embodiment.

With reference to FIG. 18, a flowchart of a process for scaling a temporal node tree is depicted in accordance with an illustrative embodiment. The process in FIG. 18 can be implemented in hardware, software, or both. When implemented in software, the process can take the form of program code that is run by one of more processor units located in one or more hardware devices in one or more computer systems. For example, the process can be implemented in tree manager 208 in computer system 210 in FIG. 2.

The process begins by changing an allocation of time units in a temporal node tree (step 1800). The process scales the temporal node tree using a policy in response to a change in the time units (step 1802). The process terminates thereafter. In step 1802, the portion of the temporal node tree to be scaled can be based on the user input selecting nodes for scaling. A node that is scaled can have changes to at least one of an allocation of time units, content, the presence of the node in temporal node tree, or other suitable characteristics of properties for the node that is scaled. For example, the scaling can include updating an allocation of time units to a node in the temporal node tree using the policy; removing a node in the temporal node tree when the allocation of the time units for the node does not meet minimum time units for the node; and identifying content for the node in the temporal node tree based on the time units allocated to the node and the policy specifying content for the node.

Figure 19:
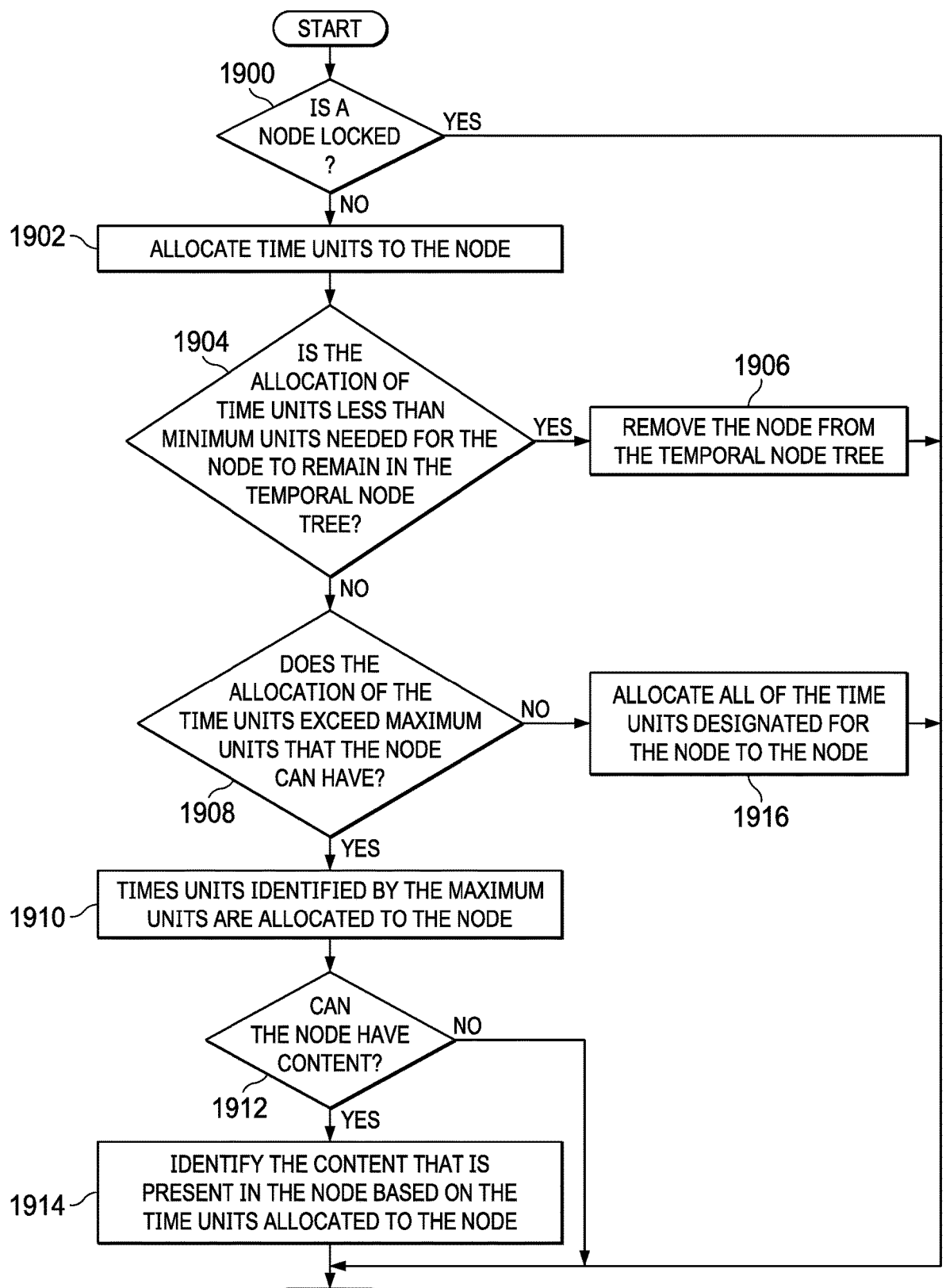
FIG. 19 is a flowchart of a process for scaling a node in a temporal node tree in accordance with an illustrative embodiment.

With reference next to FIG. 19, a flowchart of a process for scaling a node in a temporal node tree is depicted in accordance with an illustrative embodiment. The process illustrated in FIG. 19 is an example of a process that can be used to implement scaling of a node in a temporal node tree in step 1802 in FIG. 2. This process can be performed for each node that is to be scaled in the temporal node tree. The different steps in this flowchart are performed using a policy that defines what changes can occur to a node based on a change in allocation of time units to the node.

The process begins by determining whether a node is locked (step 1900). If the node is locked the process terminates. In this case, no changes are made to the node. Further, locking in this node can also effectively lock nodes that are child nodes branching from this node. If the node is locked and cannot distribute time units to child nodes, then no changes occur to the child nodes.

With reference again to step 1900, if the node is not locked, the process allocates time units to the node (step 1902). A determination is made as to whether the allocation of time units is less than minimum units needed for the node to remain in the temporal node tree (step 1904). If the allocation of time units is less than the minimum units, the process removes the node from the temporal node tree (step 1906). The process terminates thereafter. In step 1906, if the node being removed has one or more-child nodes, the removal of the node includes creating links or branches from those child nodes to the parent node of the node removed.

With reference again step 1904, if the allocation of time units is not less than the minimum units, a determination is made as to whether the allocation of the time units exceeds maximum units that the node can have (step 1908). If the allocation of the time units exceeds the maximum units, the times units identified by the maximum units are allocated to the node (step 1910). The other time units exceeding the maximum, if any, are reallocated to other nodes using policy.

A determination is then made as to whether the node can have content (step 1912). If the node cannot have the content, the process terminates.

Otherwise, the process identifies the content that is present in the node based on the time units allocated to the node (step 1914). The process terminates thereafter. In step 1914, rules are used to identify the content, such as triggers that identify when or what data objects should be present in a node. By data being present, the data is exposed for use in the time-based elements represented by the node.

With reference again to step 1908, if the allocation of the time units does not exceed the maximum units that the node can have, the process allocates all of the time units designated for the node to the node (step 1916). The process terminates thereafter.

Thus, changing the allocation of the time units results in scaling of the temporal node tree in which the time units allocated to the nodes can change. This scaling of the temporal node tree can also include changes to the content or the nodes present in the temporal node tree when the allocation of time units is changed. These changes in the scaling of the temporal node tree are made using a policy, such as policy 222 in FIG. 2

Figure 20:
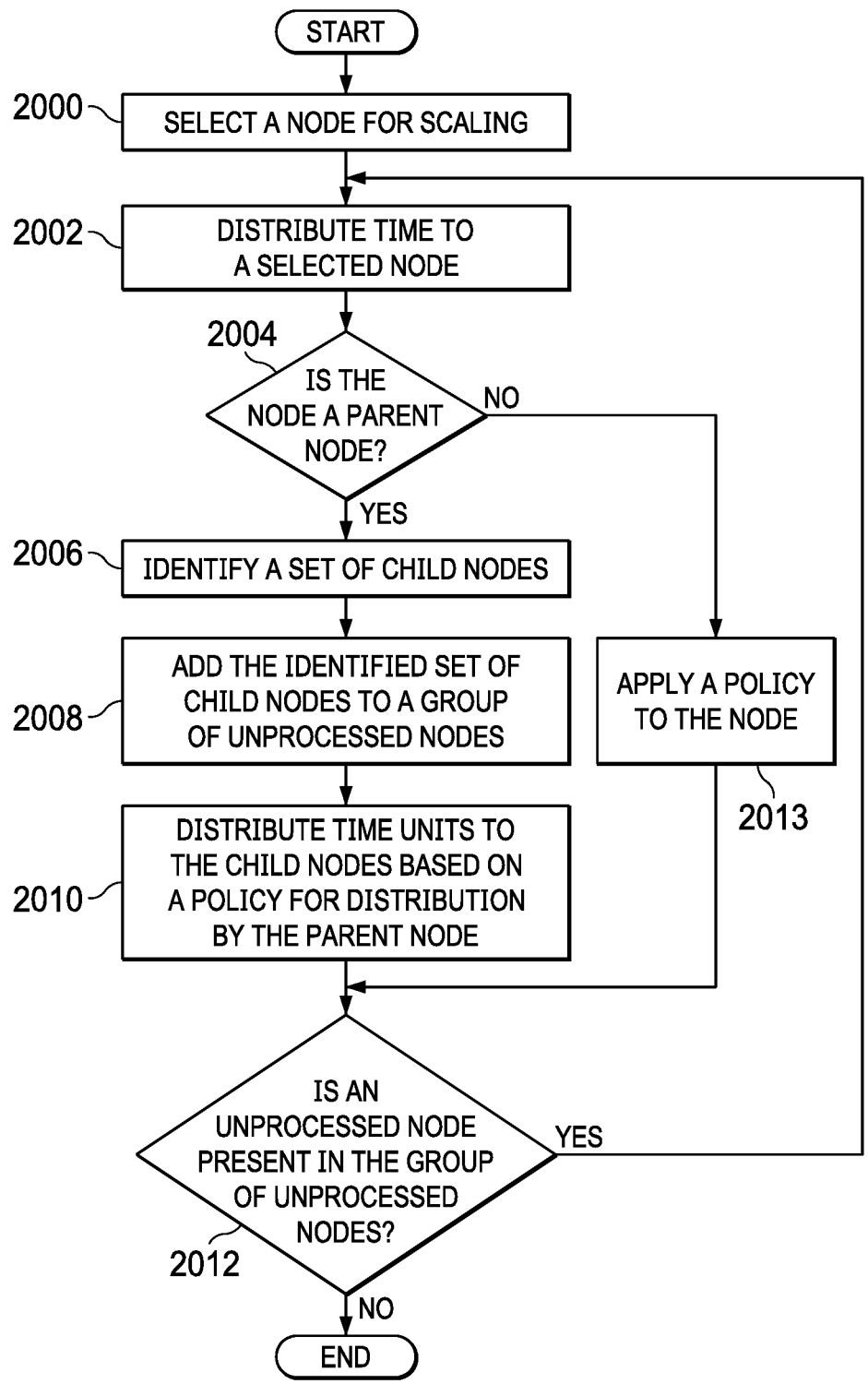
FIG. 20 is a flowchart of a process for scaling a temporal node tree in accordance with an illustrative embodiment.

With reference next to FIG. 20, a flowchart of a process for scaling a temporal node tree is depicted in accordance with an illustrative embodiment. The process in FIG. 20 can be implemented in hardware, software, or both. When implemented in software, the process can take the form of program code that is run by one of more processor units located in one or more hardware devices in one or more computer systems. For example, the process can be implemented in tree manager 208 in computer system 210 in FIG. 2. This process can be implemented in a component such as engine 400 in system of engagement 300 in tree manager 208 in FIG. 4 and is an example of an implementation for step 1800 in FIG. 18.

The process begins by selecting a node for scaling (step 2000). In step 2000, the node is selected through user input. The scaling of time units in the nodes can start from any node in the temporal node tree. For example, the node can be a leaf node. With a selection of a leaf node, only that node leaf node is scaled. In another example, the node can be another node higher up in the hierarchy of nodes in the temporal node tree. If the root node is selected, scaling is performed for the entire temporal node tree.

The process distributes time to a selected node (step 2002). A determination is made as to whether the node is a parent node (step 2004). If the node is a parent node, the process identifies a set of child nodes (step 2006) and adds the identified set of child nodes to a group of unprocessed nodes (step 2008).

The process distributes time units to the child nodes based on a policy for distribution by the parent node (step 2010). In step 2010, the distribution can be based on ratios between the child nodes. For example, if a first child has a distribution ratio of three and a second child has a distribution ratio of one, the first child node receives 75 percent of the time units and the second child receives 25 percent of the time units.

The process determines whether an unprocessed node is in the group of unprocessed nodes (step 2012). If an unprocessed node is present in the group of unprocessed nodes, the process returns step 2002. Otherwise, the process terminates.

With reference again to step 2004, if the node is not a parent node, the process applies the policy to the node (step 2013). In step 2013, the policy can include determining whether the node remains in the temporal node tree. For example, the policy for the node can specify minimum time units for the node to remain in the temporal node tree. As another example, triggers can be present for content in the node. The process then returns to step 2012 to scale another unprocessed node.

Figure 21:
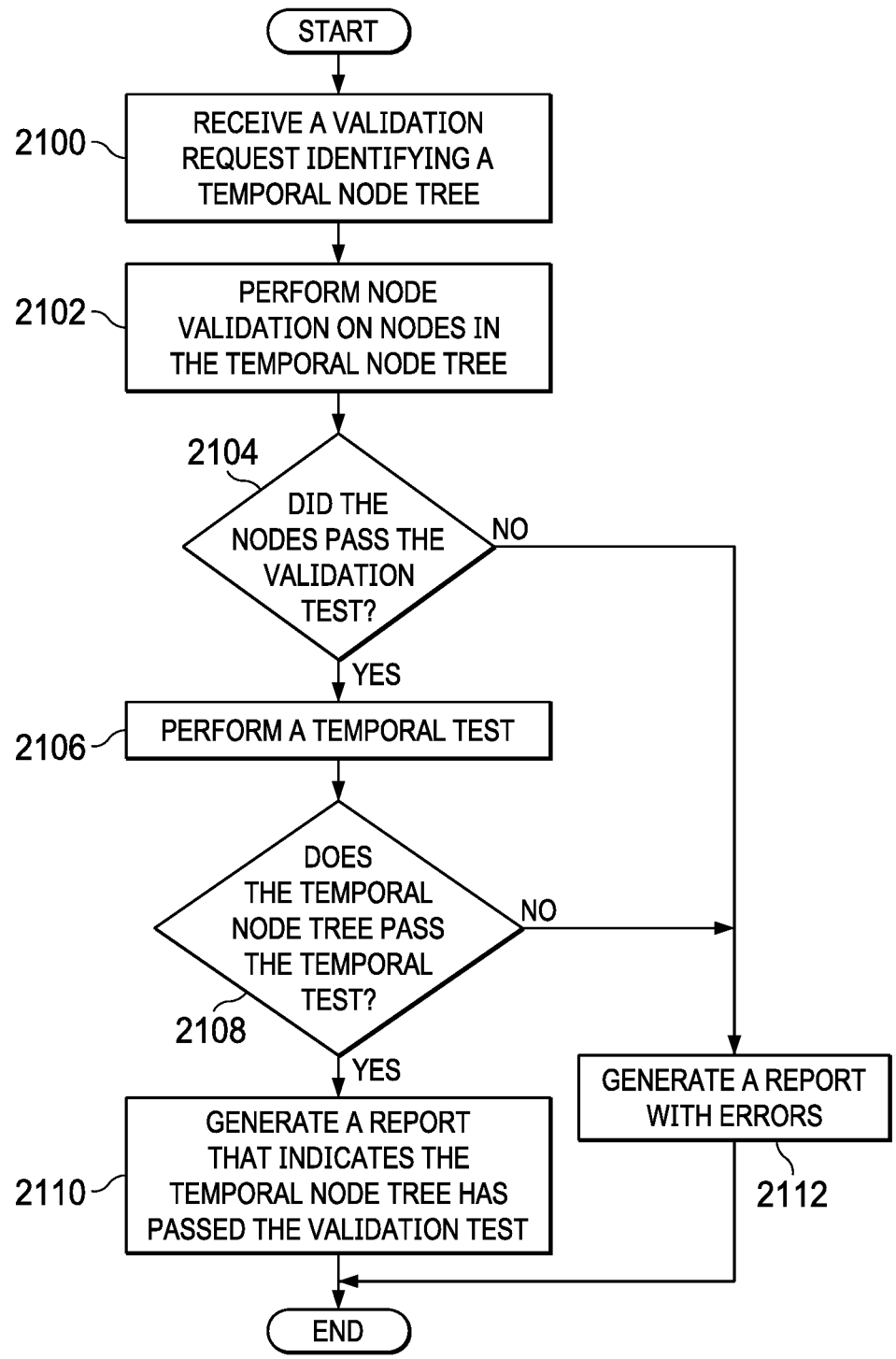
FIG. 21 is a flowchart of a process for performing validation on a temporal node tree in accordance with an illustrative embodiment.

With reference next to FIG. 21, a flowchart of a process for performing validation on a temporal node tree is depicted in accordance with an illustrative embodiment. The process in FIG. 21 can be implemented in hardware, software, or both. When implemented in software, the process can take the form of program code that is run by one of more processor units located in one or more hardware devices in one or more computer systems. For example, the process can be implemented in tree manager 208 in computer system 210 in FIG. 2. This process can be implemented in a component such as validator 304 in tree manager 208 in FIG. 3.

The process begins by receiving a validation request identifying a temporal node tree (step 2100). The process performs node validation on nodes in the temporal node tree (step 2102). In step 2102, the process checks attributes in each node in the temporal node tree. For example, the process can check for missing fields, valid content, or other attributes.

The process then determines whether the nodes passed the validation test (step 2104). If the nodes passed the validation test, the process performs a temporal test (step 2106). In step 2106, the process checks each node to determine whether a minimum time unit exceed a maximum time unit for the node being checked. As part of this determination, the process can also check the sum of the maximum time units for the child nodes to determine whether the sum maximum time units exceed the maximum time units for the root node. If the minimum time units equal the maximum time units for a node, a warning can be generated. This situation can be considered a failure to pass the test. If the situation is considered as passing the test, the warning can be included in a report to the user which indicates what errors are identified.

A determination is made as to whether the temporal node tree passes the temporal test (step 2108). If the temporal node tree passes the temporal test, the process generates a report that indicates that the temporal node tree has passed the validation test (step 2110). The process terminates thereafter.

The report in step 2108 can include statistics about the temporal node tree and the tests performed to validate the temporal node tree. Further, the report can also include warnings that may have been generated.

With reference again to step 2108, if the temporal node tree does not pass the temporal test, the process generates a report with errors (step 2112). The process terminates thereafter. Referring back to step 2104, if the temporal node tree does not pass the node validation, the process also proceeds to step 2112.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 22:
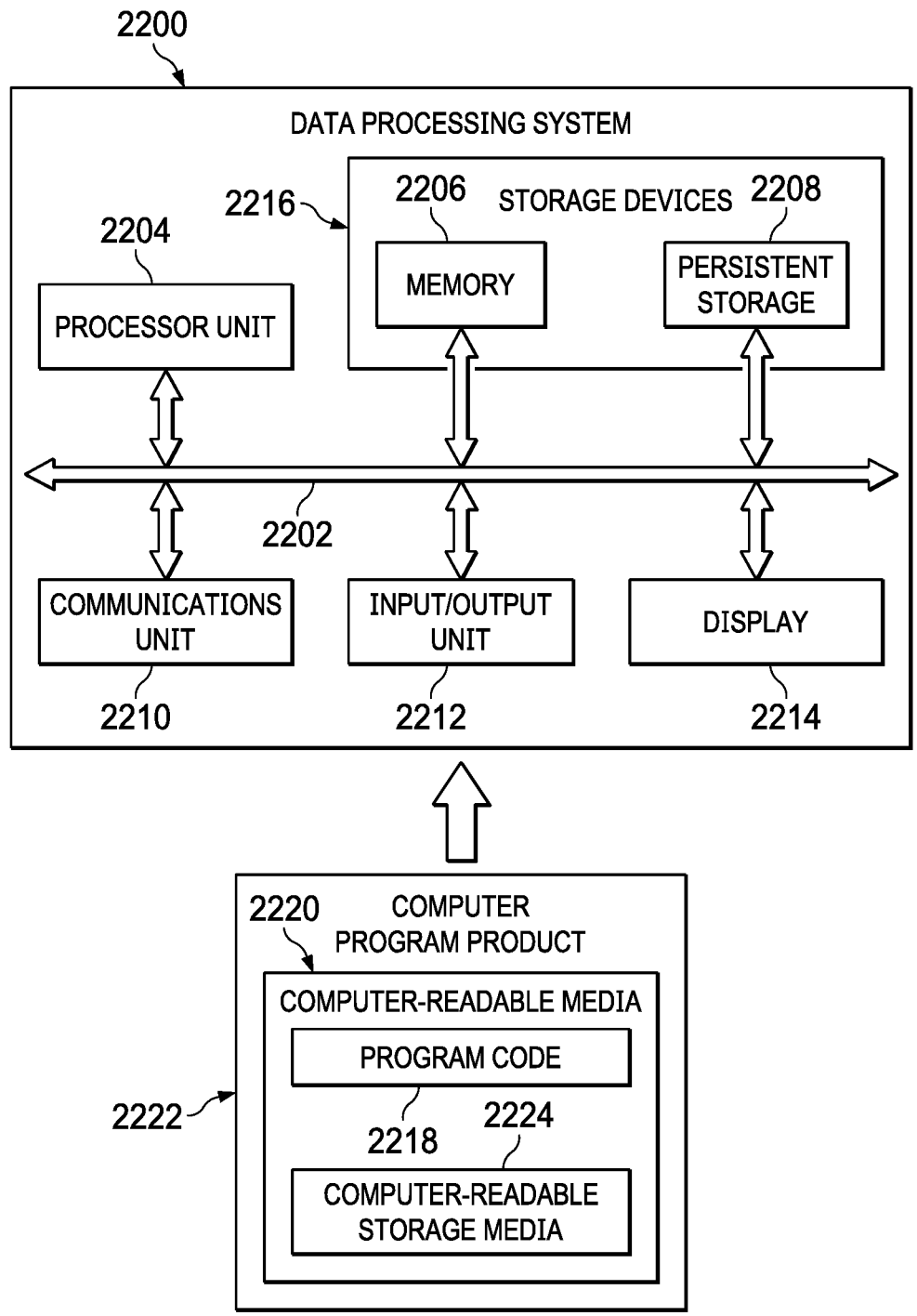
FIG. 22 is a block diagram of a data processing system in accordance with an illustrative embodiment.

Turning now to FIG. 22, a block diagram of a data processing system is depicted in accordance with an illustrative embodiment. Data processing system 2200 can be used to implement server computer 104, server computer 106, client devices 110, in FIG. 1. Data processing system 2200 can also be used to implement one or more computers or computing devices in computer system 210 in FIG. 2. In this illustrative example, data processing system 2200 includes communications framework 2202, which provides communications between processor unit 2204, memory 2206, persistent storage 2208, communications unit 2210, input/output (I/O) unit 2212, and display 2214. In this example, communications framework 2202 takes the form of a bus system.

Processor unit 2204 serves to execute instructions for software that can be loaded into memory 2206. Processor unit 2204 includes one or more processors. For example, processor unit 2204 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 2204 can may be implemented using one or more heterogeneous processor systems in which a main processor is present with secondary processors on a single chip. As another illustrative example, processor unit 2204 can be a symmetric multi-processor system containing multiple processors of the same type on a single chip.

Memory 2206 and persistent storage 2208 are examples of storage devices 2216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2216 may also be referred to as computer-readable storage devices in these illustrative examples. Memory 2206, in these examples, can be, for example, a random-access memory or any other suitable volatile or non-volatile storage device. Persistent storage 2208 may take various forms, depending on the particular implementation.

For example, persistent storage 2208 may contain one or more components or devices. For example, persistent storage 2208 can be a hard drive, a solid-state drive (SSD), a flash memory, a rewritable optical disk, a rewritable magnetic tape, or some combination of the above. The media used by persistent storage 2208 also can be removable. For example, a removable hard drive can be used for persistent storage 2208.

Communications unit 2210, in these illustrative examples, provides for communications with other data processing systems or devices. In these illustrative examples, communications unit 2210 is a network interface card.

Input/output unit 2212 allows for input and output of data with other devices that can be connected to data processing system 2200. For example, input/output unit 2212 may provide a connection for user input through at least one of a keyboard, a mouse, or some other suitable input device. Further, input/output unit 2212 may send output to a printer. Display 2214 provides a mechanism to display information to a user.

Instructions for at least one of the operating system, applications, or programs can be located in storage devices 2216, which are in communication with processor unit 2204 through communications framework 2202. The processes of the different embodiments can be performed by processor unit 2204 using computer-implemented instructions, which may be located in a memory, such as memory 2206.

These instructions are referred to as program code, computer usable program code, or computer-readable program code that can be read and executed by a processor in processor unit 2204. The program code in the different embodiments can be embodied on different physical or computer-readable storage media, such as memory 2206 or persistent storage 2208.

Program code 2218 is located in a functional form on computer-readable media 2220 that is selectively removable and can be loaded onto or transferred to data processing system 2200 for execution by processor unit 2204. Program code 2218 and computer-readable media 2220 form computer program product 2222 in these illustrative examples. In the illustrative example, computer-readable media 2220 is computer-readable storage media 2224.

In these illustrative examples, computer-readable storage media 2224 is a physical or tangible storage device used to store program code 2218 rather than a medium that propagates or transmits program code 2218.

Alternatively, program code 2218 can be transferred to data processing system 2200 using a computer-readable signal media. The computer-readable signal media can be, for example, a propagated data signal containing program code 2218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 2200 are not meant to provide architectural limitations to the manner in which different embodiments can be implemented. In some illustrative examples, one or more of the components may be incorporated in or otherwise form a portion of, another component. For example, memory 2206, or portions thereof, may be incorporated in processor unit 2204 in some illustrative examples. The different illustrative embodiments can be implemented in a data processing system including components in addition to or in place of those illustrated for data processing system 2200. Other components shown in FIG. 22 can be varied from the illustrative examples shown. The different embodiments can be implemented using any hardware device or system capable of running program code 2218.

Thus, the illustrative embodiments of the present invention provide a computer implemented method, computer system, and computer program product for managing time-based elements. In one illustrative example, a computer system identifies the time-based elements, wherein the time-based elements have time units. The computer system arranges nodes, representing the time-based elements, in a temporal node tree, wherein the nodes have the time units from corresponding time-based elements and a policy that defines scaling of the time units in the nodes.

In the illustrative examples, the temporal node tree and the policy provide a mechanism to scale the nodes in the temporal node tree. As depicted, the policy includes rules on behavior of the nodes and how the nodes can be scaled. For example, the policy includes rules defining allocation limits, locking, triggers for content, and other suitable features for a node. The illustrative examples also allow for scaling at different levels within the temporal node tree. The scaling mechanism provided in a tree manager enable scaling a temporal node tree that is extremely large and complex when manual scaling with the user viewing time-based elements is infeasible or impossible to perform within a reasonable amount of time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here

What is claimed is:

1. A method for managing time-based elements, the method comprising: identifying, by a computer system, the time-based elements in response to receiving a first user input through a graphical user interface with a tree manager for modification, wherein the time-based elements have time units;

arranging, by the computer system, nodes representing the time-based elements in a temporal node tree based on relationships of the time-based elements, wherein the nodes have the time units from corresponding time-based elements and a policy defines scaling of the nodes based on the time units allocated to the nodes;

changing, by the computer system, an allocation of the time units of the temporal node tree responsive to a second user input received through the graphical user interface;

and scaling, by the computer system, the temporal node tree using the policy in response to a change in the allocation of the time units by updating an allocation of time units to a node in the nodes using the policy, wherein the scaling, by the computer system, the temporal node tree using the policy with rules and levels in response to the change in the allocation of the time units further comprises: changing, by the computer system, content for the node by at least one of adding additional content to the node, removing certain content from the node, and modifying the content for the node;

removing, by the computer system, the node in the nodes representing the time-based units when the allocation of the time units for the node does not meet minimum time units for the node as specified by the policy, wherein particular time units for the node being removed from the temporal node tree are given to a parent node of the node being removed from the temporal node tree;

and identifying, by the computer system, the content for the node in the nodes based on the time units allocated to the node and the policy specifying the content for the node.

2. The method of claim 1, wherein the content comprises a group of data objects, wherein the policy determines when each data object in the group of data objects is present in the node based on the time units allocated to the node and the policy specifying the content for the node.

3. The method of claim 1, wherein a given node in the nodes contains a portion of the policy defining time units within the node.

4. The method of claim 3, wherein the portion of the policy includes a minimum number of time units allocated for the given node and a maximum number of time units allocated for the given node.

5. The method of claim 1, wherein the time-based elements are selected from at least one of a task, an event, a topic in an agenda, a meeting in a calendar, a manufacturing task, or a presentation for a meeting, and further comprising:

validating, by the computer system, the temporal node tree to determine whether an unreachable trigger is present in the temporal node tree.

6. The method of claim 1, wherein the policy comprises rules for what particular content is present in each of the nodes based on respective time units allocated to the each of the nodes.

7. The method of claim 1, further comprising:

changing the content for the node of the nodes representing the time-based elements in the temporal node tree in response to a change in allocation of time units for the given node using the policy.

8. The method of claim 2, wherein the group of data objects are maintained in a data structure that describes which data objects of the group of data objects can be used by the content for the node.

9. A tree management system comprising: a computer system that has a temporal node tree comprising nodes representing time-based elements having time units, wherein the nodes are arranged in the temporal node tree based on relationships of the time-based elements, the nodes have the time units from corresponding time-based elements, and a policy defines scaling of the nodes based on the time units allocated to the nodes, wherein the computer system changes an allocation of the time units of the temporal node tree responsive to a user input received through the graphical user interface with a tree manager for modification, and scales the temporal node tree using the policy in response to a change in the time units by updating an allocation of time units to a node in the nodes using the policy, wherein in scaling the temporal node tree using the policy with rules and levels in response to a change in the allocation of the time units, the computer system: changes content for the node by at least one of adding additional content to the node, removing certain content from the node, and modifying the content for the node, removes the node in the nodes representing the time-based units when an allocation of the time units for the node does not meet minimum time units for the node as specified by the policy, wherein particular time units for the node being removed from the temporal node tree are given to a parent node of the node being removed from the temporal node tree; and identifies the content for the node in the nodes based on the time units allocated to the node and the policy specifying the content for the node.

10. The tree management system of claim 9, wherein the content comprises a group of data objects, wherein the policy determines when each data object in the group of data objects is present for the node based on the time units allocated to the node.

11. The tree management system of claim 9, wherein a given node in the nodes contains a portion of the policy defining time units within the node.

12. The tree management system of claim 9, wherein the policy comprises rules for what particular content is present in each of the nodes based on respective time units allocated to the each of the nodes.

13. The tree management system of claim 9, wherein the computer system changes the content for the node of the nodes representing the time-based elements in the temporal node tree in response to a change in allocation of time units for the given node using the policy.

14. The tree management system of claim 10, wherein the group of data objects are maintained in a data structure that describes which data objects of the group of data objects can be used by the content for the node.

15. A computer program product for managing time-based elements, the computer program product comprising: a computer-readable storage media;

first program code, stored on the computer-readable storage media, for identifying the time-based elements in response to receiving a first user input through a graphical user interface with a tree manager for modification, wherein the time-based elements have time units;

second program code, stored on the computer-readable storage media, for arranging nodes representing the time-based elements in a temporal node tree based on relationships of the time-based elements, wherein the nodes have the time units from corresponding time-based elements and wherein a policy defines scaling of the nodes based on the time units allocated to the nodes;

third program code, stored on the computer-readable storage media, for changing an allocation of the time units of the temporal node tree responsive to a second user input received through the graphical user interface;

and fourth program code, stored on the computer-readable storage media, for scaling the temporal node tree using the policy with rules and levels in response to a change in the time units by updating an allocation of time units to a node in the nodes using the policy, wherein the fourth program code comprises: program code, stored on the computer-readable storage media, for changing content for the node by at least one of adding additional content to the node, removing certain content from the node, and modifying the content for the node;
program code, stored on the computer-readable storage media, for removing the node in the nodes representing the time-based units when the allocation of the time units for the node does not meet minimum time units for the node as specified by the policy, wherein particular time units for the node being removed from the temporal node tree are given to a parent node of the node being removed from the temporal node tree;
and program code, stored on the computer-readable storage media, for identifying the content for the node in the nodes based on the time units allocated to the node and the policy specifying the content for the node.

16. The computer program product of claim 15, wherein the content comprises a group of data objects, wherein the policy determines when each data object in the group of data objects is present in the node based on the time units allocated to the node and the policy specifying the content for the node.

17. The computer program product of claim 15, wherein the policy comprises rules for what particular content is present in each of the nodes based on respective time units allocated to the each of the nodes.

18. The computer program product of claim 15, further comprising:
program code, stored on the computer-readable storage media, for changing the content for the node of the nodes representing the time-based elements in the temporal node tree in response to a change in allocation of time units for the given node using the policy.

19. The computer program product of claim 16, wherein the group of data objects are maintained in a data structure that describes which data objects of the group of data objects can be used by the content for the node.

\* \* \* \* \*